United States Patent
Ducellier et al.

(10) Patent No.: US 7,236,660 B2
(45) Date of Patent: Jun. 26, 2007

(54) RECONFIGURABLE OPTICAL ADD-DROP MODULE, SYSTEM AND METHOD

(75) Inventors: Thomas Ducellier, Ottawa (CA); Alan Hnatiw, Stittsville (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 10/493,107

(22) PCT Filed: May 20, 2003

(86) PCT No.: PCT/CA03/00748

§ 371 (c)(1),
(2), (4) Date: Apr. 20, 2004

(87) PCT Pub. No.: WO03/098856

PCT Pub. Date: Nov. 27, 2003

(65) Prior Publication Data

US 2004/0252938 A1 Dec. 16, 2004

(51) Int. Cl.
G02B 6/28 (2006.01)
G02B 6/26 (2006.01)
G02B 6/00 (2006.01)

(52) U.S. Cl. .......................... 385/24; 382/16; 382/18; 382/25

(58) Field of Classification Search ............ 385/18–25, 385/47
See application file for complete search history.

(56) References Cited

U.S. PATENT DOCUMENTS

| | | |
|---|---|---|
| 4,786,131 A | 11/1988 | Mahapatra et al. |
| 5,002,350 A | 3/1991 | Dragone ................. 350/96.15 |
| 5,136,671 A | 8/1992 | Dragone |
| 5,414,540 A * | 5/1995 | Patel et al. ................. 349/196 |

(Continued)

FOREIGN PATENT DOCUMENTS

EP 0963072 3/1999

(Continued)

OTHER PUBLICATIONS

Nabeel A. Riza; Yu Huang; High Speed Optical Scanner for Multi-Dimensional Beam Pointing and Acquisition; IEEE Lasers and Electro-Optics Society 1999 12th Annual Meeting San Francisco, CA, USA Nov. 8-11, 1999.

(Continued)

*Primary Examiner*—Sung Pak
(74) *Attorney, Agent, or Firm*—Teitelbaum & MacLean; Neil Teitelbaum; Doug MacLean

(57) ABSTRACT

An apparatus, system, and method for all-optical wavelength add-drop switching are provided. A number of optical ports, including at least one input port and at least one output port, are each optically coupled to a respective dispersive element. When a multichannel optical signal is input through an input port, an optical beam of each channel emerges from the dispersive element at an angle depending upon its wavelength. The beams emerging from the dispersive element pass through a bulk optical element which redirects each beam toward a respective one of a number of routing or switching elements, each of which has been set to redirect the respective beam through the bulk optical element towards a selected dispersive element coupled to a selected output port.

60 Claims, 19 Drawing Sheets

U.S. PATENT DOCUMENTS

| | | | | |
|---|---|---|---|---|
| 5,526,453 | A | 6/1996 | Wolf et al. | 385/42 |
| 5,546,483 | A | 8/1996 | Inoue et al. | |
| 5,671,304 | A | 9/1997 | Duguay | |
| 5,917,625 | A | 6/1999 | Ogusu et al. | 359/130 |
| 5,960,133 | A | 9/1999 | Tomlinson | |
| 5,999,672 | A | 12/1999 | Hunter et al. | 385/37 |
| 6,112,000 | A | 8/2000 | Bergmann et al. | |
| 6,122,419 | A | 9/2000 | Kurokawa et al. | |
| 6,148,124 | A | 11/2000 | Aksyuk et al. | |
| 6,204,946 | B1 | 3/2001 | Aksyuk et al. | |
| 6,263,123 | B1 | 7/2001 | Bishop et al. | |
| 6,263,127 | B1* | 7/2001 | Dragone et al. | 385/24 |
| 6,289,145 | B1* | 9/2001 | Solgaard et al. | 385/17 |
| 6,337,935 | B1* | 1/2002 | Ford et al. | 385/24 |
| 6,366,709 | B1 | 4/2002 | Shekel et al. | |
| 6,571,034 | B2 | 5/2003 | Bhagavatula | |
| 6,574,380 | B2 | 6/2003 | Ranalli | |
| 6,574,396 | B1 | 6/2003 | Dragone | |
| 6,674,929 | B2* | 1/2004 | Feng et al. | 385/15 |
| 6,701,090 | B1 | 3/2004 | Hatayama et al. | |
| 6,778,728 | B2 | 8/2004 | Taylor et al. | |
| 6,778,739 | B1* | 8/2004 | Jerphagnon et al. | 385/52 |
| 6,816,640 | B2 | 11/2004 | Tew | |
| 6,956,987 | B2 | 10/2005 | Doerr | |
| 6,963,679 | B1 | 11/2005 | Novotny et al. | |
| 2001/0048782 | A1 | 12/2001 | Teng et al. | 385/11 |
| 2002/0131683 | A1 | 9/2002 | Doerr | |
| 2002/0172454 | A1 | 11/2002 | Chang | |
| 2004/0151432 | A1 | 8/2004 | Tabuchi et al. | |

FOREIGN PATENT DOCUMENTS

| | | |
|---|---|---|
| EP | 1052868 | 5/2000 |
| FR | 2794858 | 12/2000 |
| GB | 2139374 | 4/1984 |
| JP | 05-045680 | 2/1993 |
| WO | 0110069 | 7/2000 |
| WO | WO 01/93465 A1 | 3/2001 |
| WO | 0196920 | 6/2001 |

OTHER PUBLICATIONS

Y. Inoue, et al.; AThermal Silica-Based Arrayed-Waveguide Grating Multiplexer; Electronics Letters, IEE Stevenage, GB, vol. 33, No. 23, Nov. 6, 1997.

S. Bigo; Optical Fibre Communication Conference; WX 3, Anaheim, 2002.

J. Lacey; Optical Fibre Communication Conference; WT, Anaheim, 2002.

D.M. Marom, et al; Wavelength-Selective 1×4 Switch for 128 WDM Channels at 50 GHz Spacing; OFC 2002 Postdeadline Papers.

C. Dragone, IEEE Photonics Technology Letters, vol. 3, No. 9, Sep. 1991, pp. 812-815.

C. Dragone, IEEE Photonics Technology Letters, vol. 1, No. 8, Aug. 1989, pp. 241-243.

O. Ishida et al.; IEEE Photonics Technology Letters, vol. 6, No. 10, Oct. 1994, pp. 1219-1221.

C.R. Doerr et al.; IEEE Photonics Technology Letters, vol. 15, No. 1, Jan. 2003, pp. 138-140.

M. Katayama et al; Micromachined Curling Optical Switch Array for PLC-Based, Integrated Programmable Add/Drop Multiplexer; Optical Society of America, 2000.

R. Ryf et al.; European Conference on Optical Communications, PD B.1.5, Amsterdam, 2001.

M. K. Smit; Electronics Letters, vol. 24, 1988, pp. 385-386.

H. Takahashi et al.; Journal of Lightwave Technology, vol. 12, No. 6, 1994, pp. 989-995.

Ranalli, Al; Bourdon, Guillaume; Tapped Delay LNE Diffractive Array Spectrometer; Planar Lightwave Circuits 1.2.6 (2002), ECOC 2002.

Ranalli, E.; Lee, H.P.; Demonstration of a Fiber-Optic Tapped Delay Line Spectrometer; IEEE Photonics Technology Letters, vol. 6, No. 5, May 1994, pp. 668-670.

Ryf, R., et al.; Scalable Wavelength Selective Crossconnect Switch Based on MEMS and Planar Waveguides, ECOC 2001, Sep. 2001.

Takahashi et al.; Arrayed-Waveguide Grating for Wavelength Division Multi/Demultiplexer with Nanometre Resolution; Electronic Letters, vol. 26, No. 2, Jan. 18, 1990.

Soole et al.; High Performance Polarization-Independent WDM Filtering Using an InP Reflective Arrayed Waveguide Grating; LEOS Annual Meeting 1996, IEEE Boston, Nov. 18-19, 1996, pp. 228-229.

Okayama et al.; Reflective Waveguide Array Demultiplexer in $LiNbO_3$; Journal of Lightwave Technology, vol. 14, No. 6, Jun. 1996, pp. 985-990.

Patel et al.; Liquid Crystal and Grating-Based Multiple-Wavelength Cross-Connect Switch; IEEE Photonics Technology Letters, vol. 7, No. 5, May 1995, pp. 514-516.

Tachikawa et al.; Arrayed-Waveguide Grating Multiplexer With Loop-Back Optical Paths and its Applications; Journal of Lightwave Technology, vol. 14, No. 6, Jun. 1996, pp. 977-984.

Pu et al.; Client-Configurable Eight-Channel Optical Add/Drop Multiplexer Using Micromaching Technology; IEEE Photonics Technology Letters, vol. 12, No. 12, Dec. 2000, pp. 1665-1667.

Fuchs et al.; Interference-Based MEMS/Waveguide Wavelength-Selective Cross-Connect; ECOC 2002, PD3.4, Sep. 8-12, 2002.

Tsuda et al.; Performance Analysis of a Dispersion Compensator Using Arrayed-Waveguide Gratings; Journal of Lightwave Technology, vol. 18, No. 8, Aug. 2000, pp. 1139-1147.

Tsuda et al.; Second- and Third-Order Dispersion Compensator Using a High-Resolution Arrayed-Waveguide Grating; IEEE Photonics Technology Letters, vol. 11, No. 5, May 1999, pp. 569-571.

Ford et al.; Wavelength Add-Drop Switching Using Tilting Micromirrors; Journal of Lightwave Technology, vol. 17, No. 5, May 1999, pp. 904-911.

Neilson et al.; High-Dynamic Range Channelized MEMS Equalizing Filter; Optical Fiber Communications Conference 2002, paper ThCC3, Annaheim, California, Mar. 17-22, 2002, pp. 586-588.

J. Kubby et al.; Advances in MEMS Integration With Planar Waveguide Devices; Silicon based and Hybrid Optoelectronics Conference, SPIE 4653, Jan. 23-24, 2002, pp. 1-12.

Riza, Nabeel A; Sumriddetchkajom, Sarun; Fault-Tolerant Dense Multiwavelength Add-Drop Filter with Two-Dimensional Digital Micromirror Device; Applied Optics, vol. 37, No. 27, Sep. 20, 1998, pp. 6355-6361.

* cited by examiner

FIG. 1 – PRIOR ART

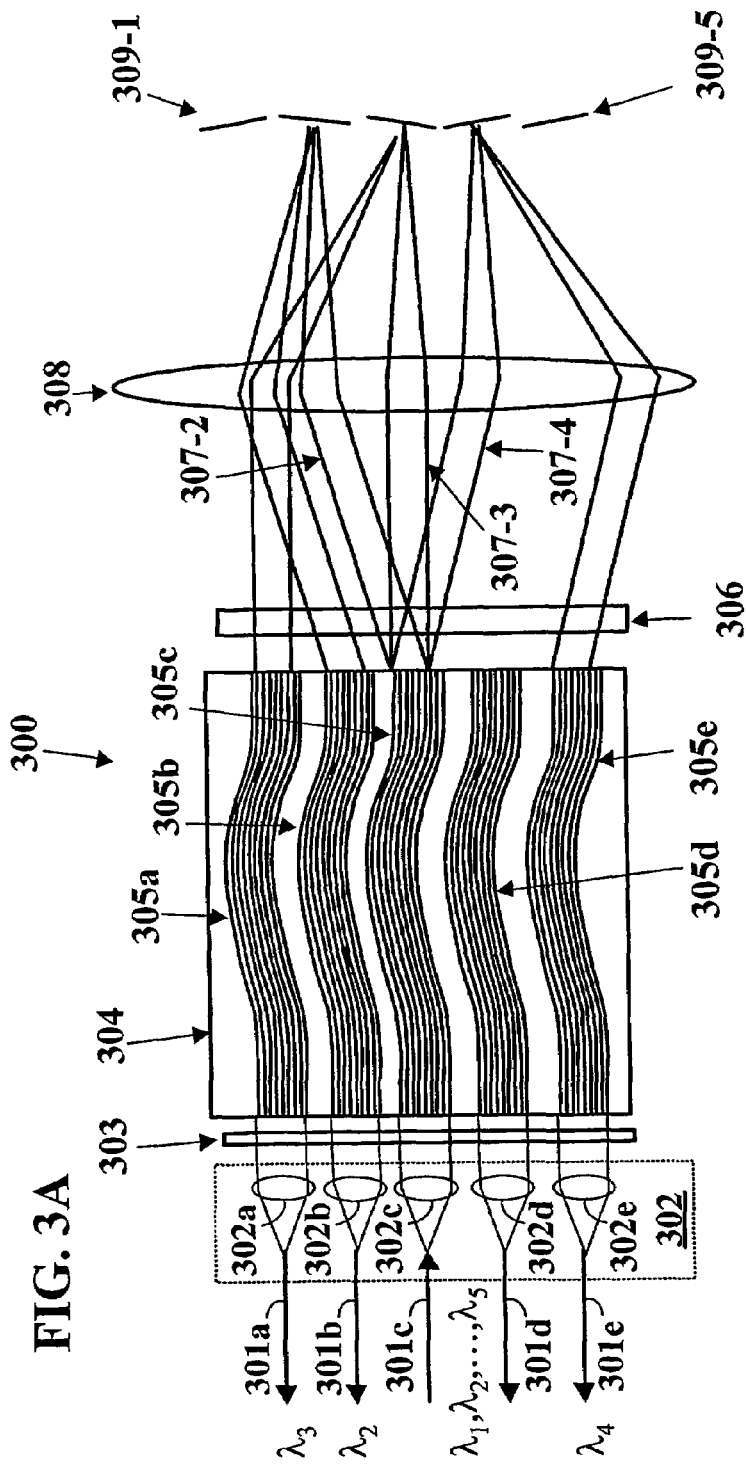
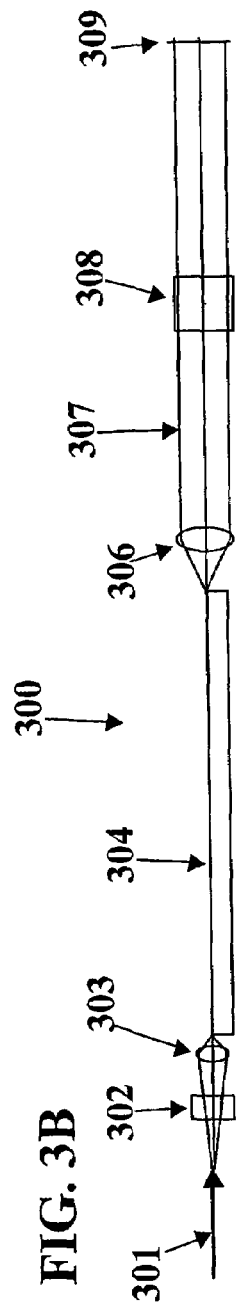

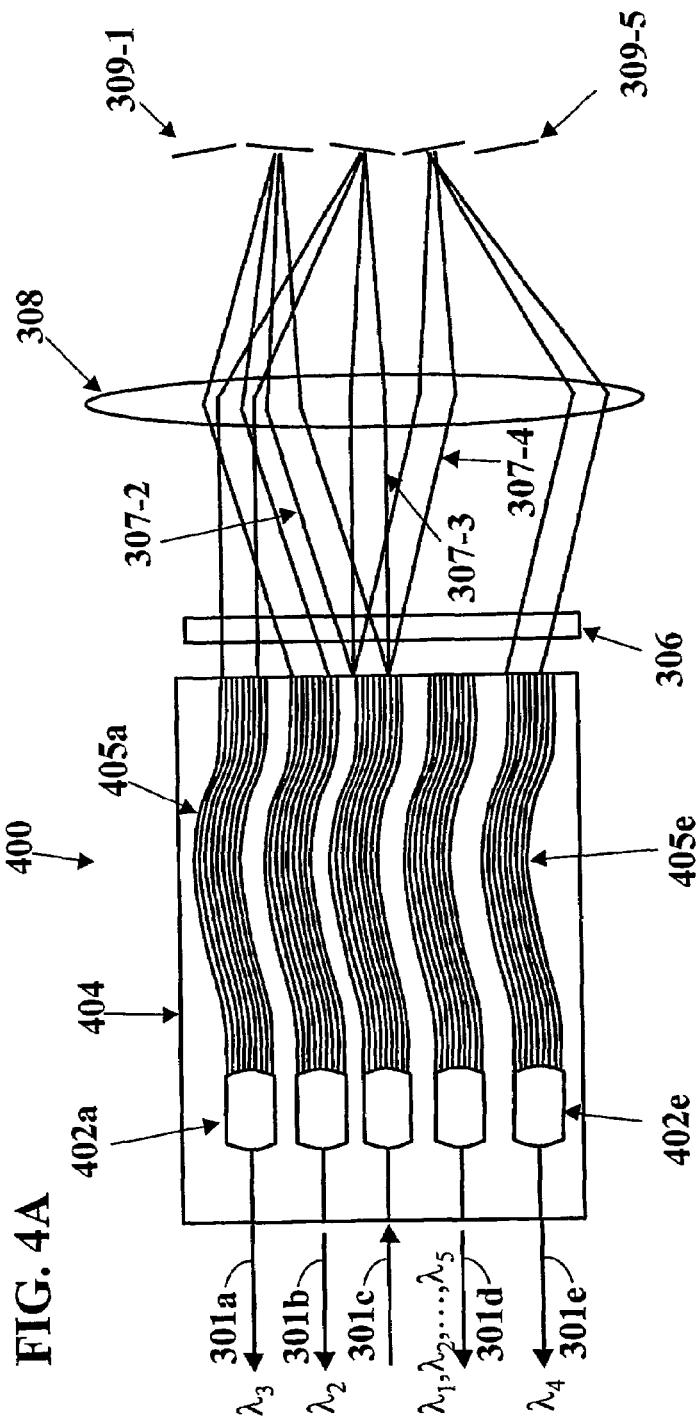
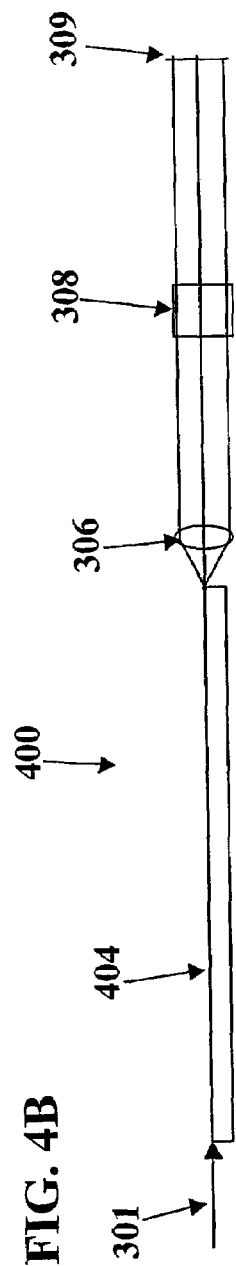
FIG. 4A
FIG. 4B

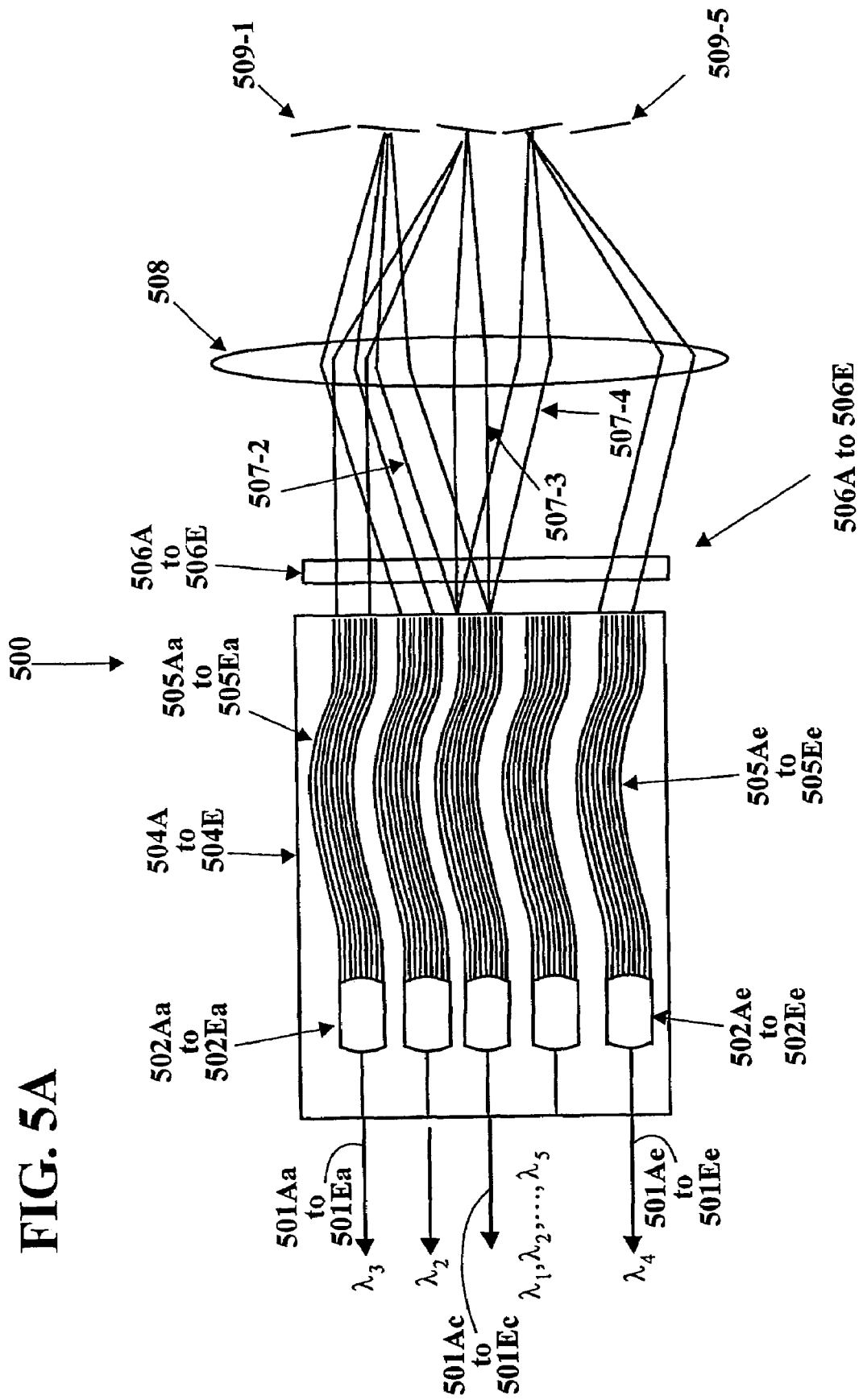

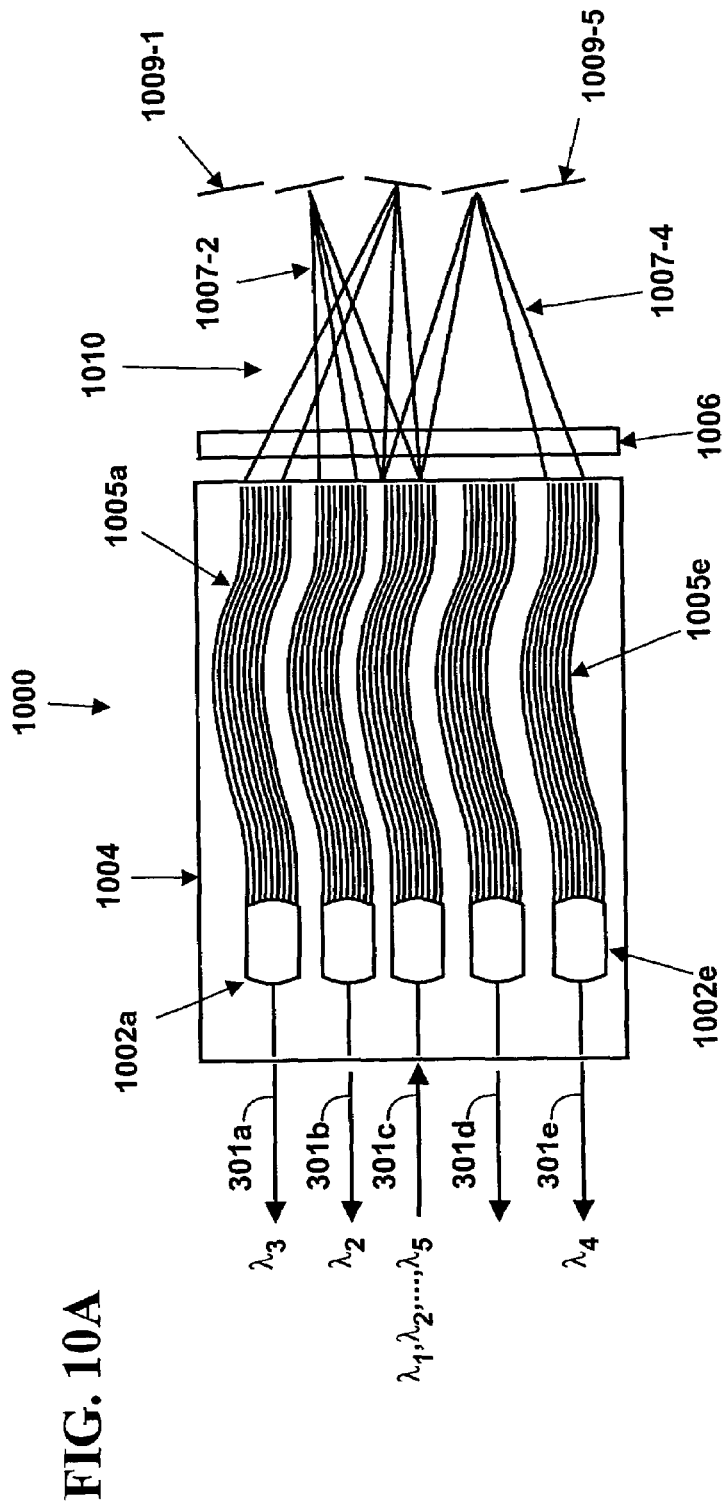
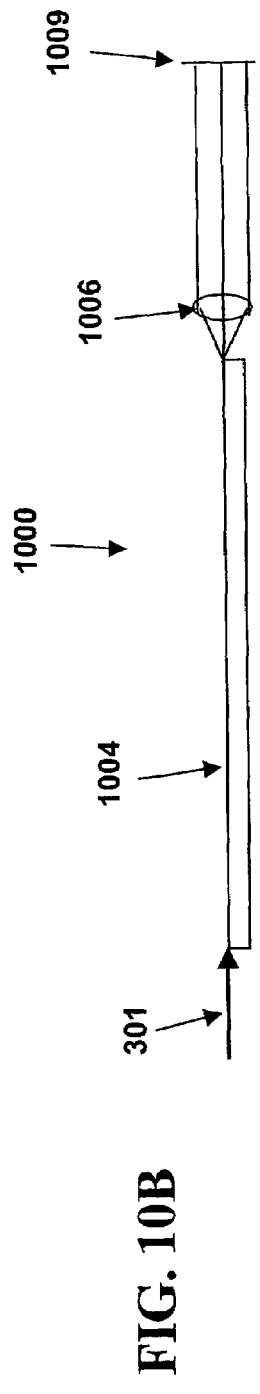
FIG. 10A
FIG. 10B

RECONFIGURABLE OPTICAL ADD-DROP MODULE, SYSTEM AND METHOD

FIELD OF THE INVENTION

This invention relates to the field of DWDM fibre optics telecommunications and in particular to the field of all-optical switching. The device provides an all-optical wavelength dependent tuneable switching function.

BACKGROUND OF THE INVENTION

The advent of DWDM fibre optics telecommunications systems in the early 1990s have enabled a dramatic increase in the transmission capacity over point-to-point communication links. This was achieved through multiplexing of a large number of individually modulated light beams of different wavelengths onto the same optical fibre. Typical systems installed today would have 64 or more independent channels precisely aligned onto an ITU-T standardized grid at 100 GHz, 50 GHz or even narrower channel spacing. With modulation speeds of routinely 10 Gb/s and attaining 40 Gb/s in laboratory experiments, it is not unusual to obtain aggregated capacities in the order of several terabits per second of information being transmitted onto a single optical fibre (S. Bigo, Optical Fibre Communication conference, WX 3, Anaheim, 2002). At the same time, electrical switching capacities have been growing at a much slower rate, with current largest electrical matrices limited to typically 640 Gb/s in a single stage. Furthermore, in most of the switching nodes, a large fraction—typically 70%—of the traffic is distant traffic that just travels through the node. It is therefore advantageous to have optical devices with large pass-through capacity and local tuneable drop capability. This device is referred to in the literature as a Reconfigurable Optical Add-Drop Module or ROADM (J. Lacey, Optical Fiber Communication conference, WT, Anaheim, 2002).

A ROADM usually includes an input port for receiving a DWDM signal, an output port for the express traffic and at least one add or drop port(s) for adding or dropping wavelength channels for local processing. This is usually realized through the subsequent steps of demultiplexing the incoming DWDM input, providing an array of switching means to route the individual channels to either the output express port or the add/drop port, and multiplexing the express channels onto a single output port. Some ROADM have multiplexed add/drop ports, some provide fully demultiplexed add/drop ports.

It is known to one skilled in the art that multiplexing/demultiplexing technologies can be done in many different ways. Serial filter embodiments (Fibre Bragg Grating, Thin Film Filters, fibre Mach Zehnder cascade, birefringent filters, etc.) are usually limited in number of wavelength channels due to insertion loss impairments. Therefore, the two solutions of choice currently being developed for ROADM applications with a large number of wavelength channels are based on parallel wavelength filtering: either free-space embodiments using bulk diffraction gratings or waveguide embodiments using AWG (Arrayed Waveguide Gratings).

Free-space optics implementations usually comprise optical fibre ports, lens elements, one bulk diffraction grating and an array of switching means. For example, Corning Inc. from Corning, N.Y., supplies such a device based on a liquid-crystal switching element. Although showing superior optical performances, free-space optics solutions are typically expensive, due to extremely tight alignment tolerances of multiple high precision optical elements. Furthermore, the relative positioning of these elements must be maintained over a wide range of environmental conditions requiring elaborate opto-mechanical designs.

Paper PD FB 7 presented at OFC'02 in March 2002 in Anaheim, Calif. provides a wavelength selective switch such as shown by way of example in FIG. 11. The switch includes input coupling optics 1200, switching elements 1202, a main lens 1204, and a single diffraction grating 1206. Disadvantageously, in this embodiment, only a small part of the service of the diffraction grating 1206 lies in the focal plane of the main lens 1204. This prevents light beams from all ports to stay in focus. Integrated optics solutions on the other hand have the potential to maintain the relative positioning of the different elements put onto the same substrate. There are two main ways of performing parallel wavelength demultiplexing in waveguides: either using AWG or using Echelle grating, the former being by far the more popular device due to the difficulty of manufacturing high precision diffraction gratings in waveguide substrates. Bragg gratings have also been employed for this purpose.

The AWG was invented by Dragone (C. Dragone, IEEE Photonics Technology Letters, Vol. 3, No. 9, pp. 812–815, September 1991) by combining a dispersive array of waveguides (M. K. Smit, Electronics Letters, Vol. 24, pp. 385–386, 1988) with input and output "star couplers" (C. Dragone, IEEE Photonics Technology Letters, Vol. 1, No. 8, pp. 241–243, August 1989). The AWG can work both as a DWDM demultiplexer and as a DWDM multiplexer, as taught by Dragone in U.S. Pat. No. 5,002,350 (March 1991).

An integrated optics ROADM would therefore consist of an input AWG to demultiplex the input DWDM stream, an array of switching means to route the demultiplexed channels to either an express path or the drop ports, and an output AWG to multiplex the output express DWDM stream. Due to the cyclic nature of the AWG's filtering function, it is possible to use only one AWG to perform the ROADM function with some loop back (O. Ishida et al., IEEE Photonics Technology Letters, Vol. 6, No. 10, pp. 1219–1221, October 1994). Typically, interconnects in an integrated optics ROADM are done primarily using guided way optics, for example using waveguides.

The switching elements can either be integrated onto the same substrate as the AWG or can be hybridized. All-integrated embodiments typically make use of thermo-optical switches (see for example C. R. Doerr et al., IEEE Photonics Technology Letters Volume 15, No. 1, January 2003, p 138 to 140), taking up a lot of substrate area and requiring careful heat management, eventually limiting its scalability. Integrated MEMS-waveguide solutions have also been proposed in the past, but the switching element is usually limited to 1×2 or 2×2, therefore also limiting scalability (M. Katayama et al., Optical Fibre Communication conference, WX4-1, Anaheim, 2001). It is known to a man skilled in the art that hybrid embodiments are possible in which AWG output waveguides are coupled to MEMS switching elements through a micro-lens array. However, this usually leads to poor spectral performance, i.e. no wide flat channel shape passband (R. Ryf et al., European Conference on Optical Communications, PD B.1.5, Amsterdam, 2001).

SUMMARY OF THE INVENTION

According to one broad aspect, the invention provides an apparatus comprising: a plurality of optical ports including at least one input optical port for receiving at least one wavelength channel and at least one output optical port; for each optical port, a respective dispersive element optically connected to the optical port; a bulk optical element having optical power; a plurality of non-transmissive routing elements; wherein for each wavelength channel: the dispersive element of the input port and the bulk optical element disperses any light of the wavelength channel towards a respective one of said plurality of routing elements, and the respective one of said plurality of routing elements directs the light of the wavelength channel via the bulk optical element to a selected output port of said at least one output port via the respective dispersive element of the selected output port, the selected output port being determined by the respective routing element.

In some embodiments, at least one routing element is also controllable so as to redirect only a portion of a wavelength channel so as to realize an attenuation function.

In some embodiments, at least one routing element is also controllable so as to redirect all of a wavelength channel so as to realize a channel block function.

In some embodiments, said at least one output port comprises at least two output ports.

In some embodiments, at least one routing element is also controllable so as to redirect only a portion of a wavelength channel so as to realize an attenuation function.

In some embodiments, at least one routing element is also controllable so as to redirect all of a wavelength channel so as to realize a channel block function.

In some embodiments, the dispersive elements are transmissive and are between the optical ports and the bulk optical element having power.

In some embodiments, each routing element is statically configured to direct light to a respective specific output port.

In some embodiments, each routing element is dynamically configurable to switch light to any output port.

In some embodiments, each dispersive element comprises an array of waveguides having a predetermined optical path length difference spread across the array.

In some embodiments, the dispersive elements are collectively integrated onto a single waveguide device.

In some embodiments, the dispersive elements are integrated into multiple waveguide devices.

In some embodiments, the apparatus further comprises micro-optics coupling elements adapted to couple light from each port to/from the respective dispersive element.

In some embodiments, the apparatus further comprises integrated optical coupling elements adapted to couple light from each port to/from the respective dispersive element.

In some embodiments, the integrated optical coupling element comprise star couplers.

In some embodiments, each dispersive element comprises a transmissive diffraction grating.

In some embodiments, the dispersive elements and the routing elements are placed substantially at focal planes of the bulk optical element having optical power.

In some embodiments, the bulk optical element having optical power is a lens or a curved mirror.

In some embodiments, the dispersive elements are integrated on a waveguide substrate, and the bulk optical element having power comprises a main cylindrical lens element adapted to focus light in a first plane in the plane of the wavelength substrate, the apparatus further comprising a transverse cylindrical lens adapted to substantially collimate light in a second plane perpendicular to the first plane.

In some embodiments, the main cylindrical lens has a focal length such that the dispersive elements are in a focal plane of the lens on a first side of the lens, and the routing elements are in a focal plane of the lens on a second side of the lens.

In some embodiments, the dispersive elements are selected from a group comprising: echelle grating, echellon gratings, prisms, arrayed waveguides.

In some embodiments, each routing element is a tiltable micro-mirror.

In some embodiments, each routing element is one of a liquid crystal beam steering element, an acousto-optic beam deflector, part of a solid state phase array, a controllable hologram, a periodically polled Lithium Niobate beam deflector.

In some embodiments, the apparatus further comprises: an athermal mount for the routing elements adapted to shift the routing elements to compensate for changes in dispersive characteristics of the dispersive elements as a function of temperature.

In some embodiments, the apparatus further comprises: an athermal mount for the dispersive elements adapted to tilt the dispersive elements to compensate for changes in dispersive characteristics of the dispersive elements as a function of temperature such that light exiting the dispersive elements is substantially centered on the routing elements.

In some embodiments, the apparatus further comprises: a birefringent crystal beam displacer between the dispersive elements and the routing elements adapted to compensate for birefringence of the dispersive elements so as to make TE and TM sub-beams substantially coincide on the routing elements.

In some embodiments, the apparatus further comprises: a quarter wave plate in an optical path of the switch adapted to swap TE and TM sub-beams to cause losses for TE and TM polarization axes to be substantially averaged out (TE/TM or TM/TE).

In some embodiments, the bulk optical element having power is a lens, each dispersive element is non-transmissive and the optical ports and routing elements are arranged on a first side of the lens and the dispersive elements are on a second side of the cylindrical lens.

In some embodiments, the dispersive elements comprise non-transmissive diffraction gratings.

According to another broad aspect, the invention provides an apparatus comprising: a plurality of optical ports including an input optical port for receiving at least one wavelength channel and at least two output optical ports; for each optical port, a respective dispersive element optically connected to the optical port; a plurality of transmissive routing elements; a first bulk optical element having optical power; and a second bulk optical element having optical power; wherein for each wavelength channel: the dispersive element of the input port and the first bulk optical element direct any light of the wavelength channel towards a respective one of said plurality of transmissive routing elements, and an appropriate setting of the respective one of said plurality of transmissive routing elements directs the light of said wavelength channel via the second bulk optical element to a respective selected port of said at least two output ports via the respective dispersive element of the selected output port, the selected output port being determined by the respective routing element.

In some embodiments, each transmissive routing element is statically configured to direct light to a respective specific output port.

In some embodiments, each transmissive routing element is dynamically configurable to switch light to any output port.

In some embodiments, each dispersive element comprises an array of waveguides having a predetermined optical path length difference spread across the array.

In some embodiments, the dispersive element of the input port is integrated onto a first waveguide device, and the dispersive elements of the output ports are integrated onto a second waveguide device.

In some embodiments, the dispersive element of the input port is integrated onto a first waveguide device, and the dispersive elements of the output ports are integrated onto a stack of waveguide devices.

In some embodiments, the apparatus further comprises micro-optics coupling elements adapted to couple light from each port to/from the respective dispersive element.

In some embodiments, the apparatus further comprises integrated optical coupling elements adapted to couple light from each port to/from the respective dispersive element.

In some embodiments, the integrated optical coupling element comprise star couplers.

In some embodiments, the dispersive element of the input port is placed substantially at a focal plane of the first bulk optical element having optical power, and the dispersive elements of the output ports are placed substantially at a focal plane of the second bulk optical element having optical power, and the routing elements are also at a focal distance from both the first and second bulk optical elements.

In some embodiments, the first bulk optical element and the second bulk optical element are each a lens or, a curved mirror.

In some embodiments, the first bulk optical element having power comprises a first main cylindrical lens adapted to focus light in a first plane in the plane of first waveguide substrate; the second bulk optical element having optical power comprises a second main cylindrical lens adapted to focus light in a second plane in the plane of second waveguide substrate: the apparatus further comprising: a first transverse cylindrical lens adapted to substantially collimate light in a third plane perpendicular to the first plane; a second transverse cylindrical lens adapted to substantially collimate light in a fourth plane perpendicular to the second plane.

In some embodiments, the first main cylindrical lens has a focal length such that the dispersive element of the input port is in a first focal plane of the first main cylindrical lens on a first side of the first main cylindrical lens, and the transmissive routing elements are in a second focal plane of the first main cylindrical lens on a second side of the first main cylindrical lens; wherein the second main cylindrical lens has a focal length such that the dispersive elements of the output port are in a first focal plane of the second main cylindrical lens on a first side of the second main cylindrical lens, and the transmissive routing elements are in a second focal plane of the second main cylindrical lens on a second side of the second main cylindrical lens.

In some embodiments, the waveguide dispersive elements are selected from a group comprising: echelle grating, echellon gratings grisms, prisms, arrayed waveguides.

In some embodiments, the apparatus further comprises: an athermal mount for the routing elements adapted to shift the routing elements to compensate for changes in dispersive characteristics of the dispersive elements as a function of temperature.

In some embodiments, the apparatus further comprises: a first athermal mount for the dispersive, element of the input port adapted to tilt the dispersive element of the input port to compensate for changes in dispersive characteristics of the dispersive element as a function of temperature such that light exiting the dispersive elements is substantially centered on the transmissive routing elements; a second athermal mount for the dispersive elements of the output ports adapted to tilt the dispersive elements of the output ports to compensate for changes in dispersive characteristics of the dispersive elements as a function of temperature such that light exiting the transmissive routing elements is accurately aligned with the dispersive elements of the output ports.

In some embodiments, the apparatus further comprises: a first birefringent crystal beam displacer between the dispersive element of the input port and the routing elements adapted to compensate for birefringence of the dispersive element of the input port so as to make TE and TM sub-beams substantially coincide on the routing elements; and a second birefringent crystal beam displacer between the dispersive elements of the output port and the routing elements adapted to compensate for birefringence of the dispersive elements of the output ports so as to make TE and TM sub-beams substantially coincide on the routing elements.

In some embodiments, the apparatus further comprises: a first quarter wave plate in an optical path of the switch on a first side of the transmissive routing elements adapted to swap TE and TM sub-beams to cause losses for TE and TM polarization axes to be substantially averaged out (TE/TM or TM/TE); a second quarter wave plate in an optical path of the switch on a second side of the transmissive routing elements adapted to swap TE and TM sub-beams to cause losses for TE and TM polarization axes to be substantially averaged out (TE/TM or TM/TE).

In some embodiments, the dispersive elements are non-transmissive.

According to another broad aspect, the invention provides an apparatus comprising: a stacked plurality of rows of optical ports, the ports comprising an input optical port for receiving at least one wavelength channel and at least two output optical ports; for each optical port, a respective dispersive element optically connected to the optical port; a bulk optical element having optical power; a plurality of routing elements; wherein for each wavelength channel: the dispersive element of the input port and the bulk optical element disperse any light of the wavelength channel towards a respective one of the plurality of routing elements, and the respective one of the plurality of routing elements directs the light of said wavelength channel via the bulk optical element to a respective selected output port via the respective dispersive element of the selected output port, the selected output port being determined by the respective routing element.

In some embodiments, each routing element is statically configured to switch light to a respective specific output port.

In some embodiments, each routing element is dynamically configurable to switch light to any output port.

In some embodiments, each dispersive element comprises an array of waveguides having a predetermined optical path length difference spread across the array.

In some embodiments, the dispersive elements of each row are collectively integrated onto a respective waveguide device.

In some embodiments, the apparatus further comprises micro-optics coupling elements adapted to couple light from each port to/from the respective dispersive element.

In some embodiments, the apparatus further comprises integrated optical coupling elements adapted to couple light from each port to/from the respective dispersive element.

In some embodiments, the integrated optical coupling element comprise star couplers.

In some embodiments, each dispersive element comprises a diffraction grating.

In some embodiments, the dispersive elements and the routing elements are placed substantially at focal planes of the bulk optical element having optical power.

In some embodiments, the bulk optical element having optical power is a lens or a curved mirror.

In some embodiments, the bulk optical element having power comprises a main cylindrical lens element adapted to focus light in a first plane in the plane of the waveguide devices; the apparatus further comprising: for each waveguide device, a respective transverse cylindrical lens adapted to substantially collimate light in a respective second plane perpendicular to the plane of the waveguide device.

In some embodiments, the main cylindrical lens has a focal length such that the dispersive elements are in a focal plane of the lens on a first side of the lens, and the routing elements are in a focal plane of the lens on a second side of the lens.

In some embodiments, the dispersive elements are selected from a group comprising: echelle grating, echellon gratings grisms, prisms, arrayed waveguides.

In some embodiments, each routing element is a micro-mirror tiltable in two dimensions.

In some embodiments, each routing element is one of a liquid crystal beam steering element, an acousto-optic beam deflector, part of a solid state phase array, a controllable hologram, a periodically polled Lithium Niobate beam deflector.

In some embodiments, the apparatus further comprises: an athermal mount for the routing elements adapted to shift the routing elements to compensate for changes in dispersive characteristics of the dispersive elements as a function of temperature.

In some embodiments, the apparatus further comprises: an athermal mount for the dispersive elements adapted to tilt the dispersive elements to compensate for changes in dispersive characteristics of the dispersive elements as a function of temperature such that light exiting the dispersive elements is substantially centered on the routing elements.

In some embodiments, the apparatus further comprises: a birefringent crystal beam displacer between the dispersive elements and the routing elements adapted to compensate for birefringence of the dispersive elements so as to make TE and TM sub-beams substantially coincide on the routing elements.

In some embodiments, the apparatus further comprises: a quarter wave plate in an optical path of the switch adapted to swap TE and TM sub-beams to cause losses for TE and TM polarization axes to be substantially averaged out (TE/TM or TM/TE).

According to another broad aspect, the invention provides a wavelength selective optical switch comprising: a stacked plurality of rows of optical ports, the ports comprising an input optical port for receiving at least one wavelength channel and at least two output optical ports; for each row of optical ports, a respective dispersive element optically connected to the row of optical ports; a bulk optical element having optical power; a plurality of routing elements; wherein for each wavelength channel: the dispersive element of the input port and the bulk optical element disperses any light of the wavelength channel towards a respective one of the plurality of routing elements, and the respective one of the plurality of routing elements directs the light of said wavelength channel via the bulk optical element to a respective selected output port via the respective dispersive element of the row of optical ports to which the selected output port belongs, the selected output port being determined by the respective routing element.

According to another broad aspect, the invention provides a wavelength selective optical switch comprising: an input optical port for receiving at least one wavelength channel and a stacked-plurality of rows of output optical ports; for each optical port, a respective dispersive element optically connected to the optical port; a plurality of transmissive routing elements; a first bulk optical element having optical power between the dispersive element of the input port and the plurality of transmissive routing elements; and a second bulk optical element having optical power between the dispersive elements of the output ports and the plurality of routing elements; wherein for each wavelength channel: the dispersive element of the input port and the first bulk optical element direct any light of the wavelength channel towards a respective one of said plurality of transmissive routing elements, and an appropriate setting of the respective one of said plurality of transmissive routing elements directs the light of said wavelength channel through the second bulk optical element to a respective selected output port via the respective dispersive element.

According to another broad aspect, the invention provides an apparatus comprising: at least two optical ports; a waveguide substrate containing at least two waveguide dispersive elements optically connected to the optical ports, each waveguide dispersive element comprising a respective array of waveguides, the waveguide dispersive elements having a first linear phase term for dispersion, and having at least a second parabolic phase term to focus the beam in the plane of the substrate; a free-space propagation region; a plurality of switching elements each adapted to establish a plurality of optical paths through the free-space propagation region from any respective first one of the waveguide dispersive elements to any respective second one of the waveguide dispersive elements.

In some embodiments, an apparatus further comprises a transverse cylindrical lens which does not affect light propagation in a plane of the waveguide dispersive elements, but substantially collimates the light in a plane perpendicular to the waveguide dispersive elements.

According to another broad aspect, the invention provides an apparatus comprising: at least three optical ports; for each optical port a respective dispersive element; a bulk optical element having optical power optically coupled to all of the ports.

According to another broad aspect, the invention provides a method comprising: receiving a light signal through an input port of a plurality of rows of optical ports; for each of a plurality of wavelength channels: a) dispersing any light of the wavelength channel in the input signal towards a respective one of a plurality of routing elements via a respective dispersive element of the input port and via a bulk optical element having optical power; b) the respective routing element directing the light of said wavelength channel via the bulk optical element to a respective selected output port of said plurality of rows of ports via a respective dispersive element of the selected output port, the selected output port being determined by the respective routing element.

BRIEF DESCRIPTION OF THE DRAWINGS

The invention will be described in further detail with reference to the attached drawings in which:

FIG. 3A is a top view of a combined hybrid waveguide and MEMS ROADM embodiment with 4 drop ports and 5 wavelength channels provided by an embodiment of the invention, in which integrated optics provides only an array of dispersion elements;

FIG. 3B is a side view of the embodiment of FIG. 3A;

FIG. 4A is a top view of a preferred embodiment of a hybrid waveguide and MEMS ROADM with 4 drop ports and 5 wavelength channels as per an embodiment of the invention, in which integrated optics provide an array of dispersion elements and an array of coupling optics;

FIG. 4B is a side view of the embodiment of FIG. 4A;

FIG. 5A is a top view of an alternate embodiment of the invention featuring multiple waveguide substrates stacked on top of each other and having MEMS elements which are capable of tilting in two dimensions;

FIG. 10A is a top view of an embodiment of the invention in which the main cylindrical lens is encoded into the phase profile of the waveguide dispersive element with a free-space propagation region between the waveguide device and the MEMS array;

FIG. 10B is a side view of FIG. 10A.

DETAILED DESCRIPTION OF THE PREFERRED EMBODIMENTS

In the following descriptions like numerals refer to same objects (for FIG. 1 to FIG. 2, and for FIG. 3A to FIG. 10B).

Figure 1:
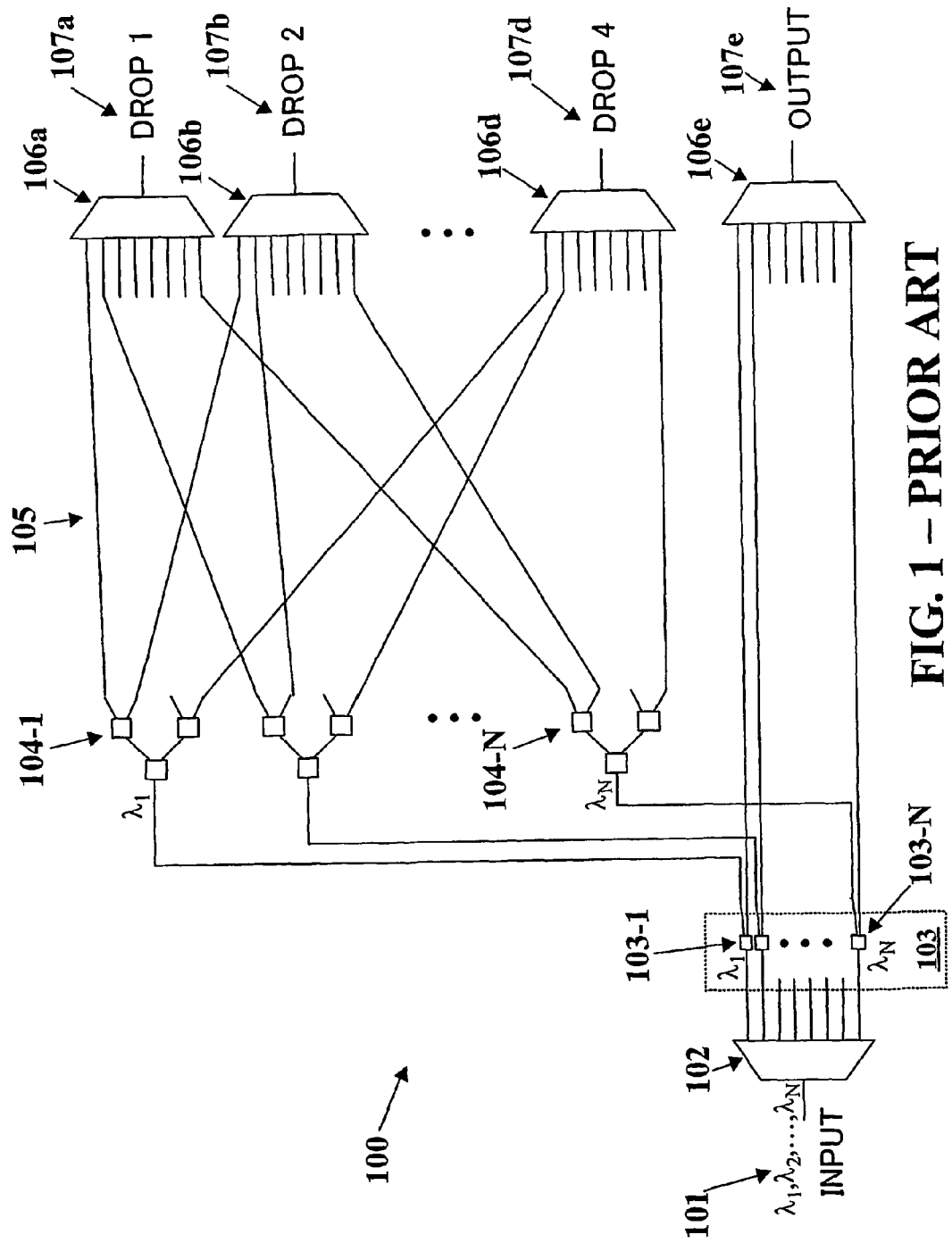
FIG. 1 is a schematic diagram of a known all-integrated waveguide ROADM with 4 drop ports.

FIG. 1 shows a schematic of a conventional all-waveguide ROADM 100 with one input port 101, one express output 107e and four tuneable drop ports 107a, 107b, 107c, 107d. A DWDM light beam containing N wavelength channels $\lambda_1 \ldots \lambda_N$ is input to the input port 101 of the device. The different wavelength channels are then demultiplexed by a first AWG device 102. N outputs from the first AWG device 102 are then coupled to a switch array 103 of N 1×2 switches 103-1 to 103-N. One of the two outputs of each 1×2 switch of the switch array 103 is connected directly to the express output 107e through an express multiplexer AWG 106e. The other of the two outputs of each 1×2 switch of the switch array 103 is coupled to a 1×4 switch array containing 1×4 switches 104-1 to 104-N. Due to the unavailability of larger switching kernel, each 1×4 switch is usually implemented by a 2-stage switching tree made of 3 1×2 switches each. In the waveguide shuffle area 105, each of the four outputs of the 1×4 switches 104-1 to 104-N is then connected to the drop ports 107a to 107d through the drop side multiplexers (AWGs 106a to 106d).

Figure 2:
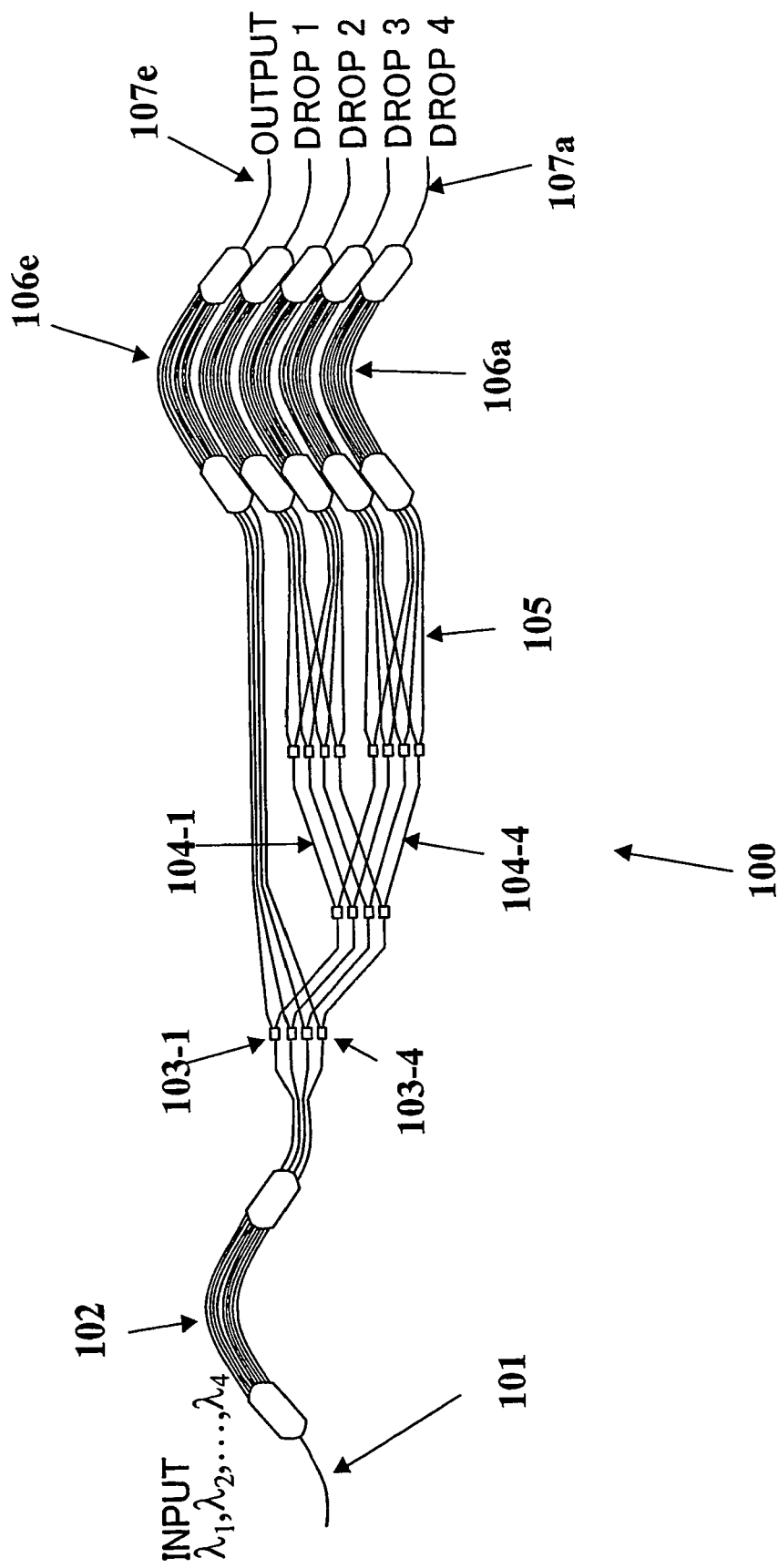
FIG. 2 is a layout view of a known 4 channel all-integrated waveguide ROADM with 4 drop ports.

FIG. 2 shows the layout view of a device as in FIG. 1 with four wavelength channels $\lambda_1 \ldots \lambda_4$. The device represents a ROADM 100 with one input, one express output and four drop ports. (see for example C. R. Doerr et al., IEEE Photonics Technology Letters Volume 15, No. 1, January 2003, p 138 to 140) A DWDM multiplexed light beam containing four wavelength channels $\lambda_1 \ldots \lambda_4$ is input to the input port 101 of the device. The different wavelength channels are then demultiplexed by a first AWG device 102. The four outputs from the first AWG are then coupled to an array of four 1×2 switches 103-1 to 103-4. One of the two outputs of each 1×2 switch of the switch array 103 is connected directly to the express output 107e through the express multiplexer AWG 106e. The other of the two outputs of each 1×2 switch of the switch array 103 is coupled to one of the 1×4 switches 104-1 to 104-4. In the waveguide shuffle area 105, each of the four outputs of the 1×4 switches 104-1 to 104-4 is then connected to the drop ports 107a to 107d through the drop side multiplexers AWGs 106a to 106d. As mentioned earlier, all interconnects are guided optical paths within waveguides.

It is noted that in the embodiment of FIG. 3A described below, and in all other embodiments, the description deals specifically with dropping wavelength channels. Usually this involves a single input port and multiple output ports. Alternatively, these same embodiments can function to add wavelength channels simply by interchanging the roles of the ports. Thus for example, a one input port, four drop (output) port implementation can equally function as a one output port, four input (add) port implementation.

FIG. 3A shows a top view of a hybrid waveguide and MEMS ROADM 300 provided by an embodiment of the invention having one input port 301c, four drop ports 301a, 301b, 301d, 301e and five wavelength channels $\lambda_1, \lambda_2, \lambda_3, \lambda_4, \lambda_5$. The physical ports are any suitable optical port implementation. For example, each port might be a single mode optical fibre or a waveguide. An input DWDM light beam containing five wavelength channels $\lambda_1 \ldots \lambda_5$ is input to the device 300 through input port 301c. The light beam is coupled to a waveguide device 304 through a micro-optics coupling scheme consisting of cylindrical lens 302c substantially collimating the light in the plane of the figure, while letting the light go through unaffected in the orthogonal plane and cylindrical lens 303 substantially re-focussing the light in the plane perpendicular to that of the figure while letting the light traverse unaffected in the plane of the figure. The cylindrical lens 303 and cylindrical lens 302a, 302b, 302d, 302e provide coupling optics for output ports 301a, 301b, 301d, 301e respectively. The transformed elliptical light beam (substantially collimated in the plane of the figure and substantially focussed in the plan perpendicular of the figure) is coupled to the waveguide region 305c of a waveguide device 304. This waveguide region 305c consists in an array of waveguides arranged such that a predetermined path length variation is spread across the array. This arrangement is known to a man skilled in the art to provide a waveguide based dispersive element (M. K. Smit, Electronics Letters, Vol. 24, pp. 385–386, 1988). Therefore the light exiting waveguide section 305c exhibits an angle dependent on the wavelength according to design parameters of the waveguide section 305c.

Throughout this description, a wavelength channel is an arbitrary contiguous frequency band. A single wavelength channel might include one or more ITU wavelengths and intervening wavelengths for example. Even though the expression "$\lambda$" is referred to herein in respect of a wavelength channel, this is not intended to imply a wavelength channel is a single wavelength only.

For ease of description, three out of the five wavelength channels (for example $\lambda_2$, $\lambda_3$, $\lambda_4$) have been shown in the portion of FIG. 3A to the right of waveguide device 304 although all five would be present at the exit of the waveguide device 305c. These demultiplexed light beams 307-1 to 307-5 first traverse cylindrical lens 306 which does not affect the light propagation in the plane of the figure, but substantially collimate the light in the perpendicular plane. A main cylindrical lens element 308 is used to focus the light in the plane of the paper, while not affecting light propagation in the perpendicular plane, making each demultiplexed light beam 307-1 to 307-5 incident upon a switching element 309-1 to 309-5. These switching elements in one embodiment consist of tilting micro-mirrors used to redirect the light at a selectable angle. There can be one tilting micro-mirror per wavelength channel.

After reflection from the mirror array 309-1 to 309-5, the light beams 307-1 to 307-5 are collimated in a plane perpendicular to the plane of the waveguide device 304 by cylindrical lens 306 and are focused in the plane of the waveguide device 304 by cylindrical lens 308. In the preferred embodiment, the lens 308 is arranged such that the end of the waveguide device 304 and the switching array 309 are placed at the lens focal planes, guaranteeing that irrespective of the tilting angle of the MEMS array 309-1 to 309-5, the angle of incidence of the light beams 307-1 to 307-5 when they couple back to the waveguide device 304 is substantially the same as the angle upon exit of the waveguide device 304. Therefore when the MEMS tilt angle is controlled in such a way that the light beams 307-1 to 307-5 are aligned with any of the waveguide sections 305a to 305e, this construction allows for an efficient coupling and re-multiplexing of the light beams into exiting light beams coupled to the output ports 301a, 301b, 301d, 301e through coupling optics 302a, 302b, 302d, 302e described earlier.

FIG. 3A shows waveguide dispersive elements in the form of an array of waveguides. More generally, an embodiment like that of FIG. 3A can employ any suitable waveguide dispersive element. For example, one can use Echelle gratings etched into the waveguide.

FIG. 3A shows micro-optics coupling scheme in the form of cylindrical lenses 302 and collimating lens 303. Other micro-optics arrangements can employed, for example, gradient-index rod lens (Selfoc®, from NSG America) or other types of lens to the same effect.

FIG. 3A shows switching elements in the form of MEMS array 309. Alternatively one can use various other beam steering elements, like liquid crystal beam steering elements, programmable diffraction gratings, phase arrays, tilting prisms, or moving lens. More generally, routing elements can be employed. Routing elements may perform a switching function and hence also be switching elements, or may perform only a static routing function.

FIG. 3A shows a cylindrical lens 308 which performs routing between the dispersive elements and the routing elements. More generally, a bulk optical element having optical power can be employed. For the purpose of this description, a bulk optical element having optical power can be a curved mirror or a lens. Various types of lenses can be employed for different applications. All the wavelength channels pass through the bulk optical element in the case of it being a lens, or reflect off the bulk optical element in the case of it being a curved mirror. In some embodiments, such as the embodiment of FIG. 3A, the wavelength channels all pass through the bulk optical element having optical power twice, once on the way towards the routing elements and once on the way back. In other embodiments, such as those featuring tranmissive switching elements described below, there are multiple bulk optical elements having optical power. However, the constraint that all the wavelength channels to be routed pass through each bulk optical element having optical power remains the same.

To simplify the description of this embodiment, it is shown as being a four drop ROADM with five wavelength channels, although it is to be understood that different numbers of ports and different numbers of wavelength channels can be accommodated by proper design of the array of waveguide dispersive elements and array of switching elements.

In some embodiments, the cylindrical lens 308 is put substantially in-between the waveguide device 304 and the switching array 309 whereby the optical distance between the waveguide device 304 and the cylindrical lens 308 and the optical distance between the cylindrical lens 308 and the switching array 309 are each substantially equal to the effective focal length of the cylindrical lens 308. This system, known to one skilled in the art as a "4f system" is beneficial to obtain good coupling from and to the waveguide element 304 (telecentric imaging system). If the micro-mirrors 309 are further able to tilt in the plane perpendicular to that of the figure, a "hitless" operation can be guaranteed by arranging the switching in the subsequent steps of: first moving the beams 307 out-of-the plane of the figure (by tilting the micro-mirrors in a plane perpendicular to that of the figure), then steering the beams 307 to their appropriate location in the plane of the figure (by tilting the micro-mirrors in the plane of the figure) and finally establishing the coupling by aligning the beams 307 axis with that of the substrate of the waveguide device 304 (by tilting the micro-mirrors in a plane perpendicular to that of the figure an opposite amount to that imparted in the first step of the switching sequence). This switching sequence guarantees that upon switching, the light beams 307 only couple to their appropriate output ports and there is no crosstalk into other output ports.

After being reflected and re-directed by micro-mirrors 309-1 to 309-5, the light beams 307-1 to 307-5 propagate back to the waveguide device 304 through cylindrical lenses 308 and 306. Due to the geometry of the above mentioned 4f system, when the tilt angle of the micro-mirrors 309 are properly adjusted, each beam 307-1 to 307-5 can be routed to any of the waveguide dispersive elements 305a to 305e with good coupling performance. This is the consequence of the telecentricity of the 4f arrangement, which guarantees that the exit angle of the beams 307-1 to 307-5 upon exit of the waveguide element 304 and the angle of incidence of these beams while coming back to the waveguide element 304 are parallel, matching the dispersion requirement for the different waveguide dispersive elements 305a to 305e. For example, the demultiplexed beam 307-3 corresponding to 3 is exiting the waveguide device 304 from the middle waveguide dispersive element 305c with 0 degree angle. After being routed to MEMS device 309-3 by cylindrical lens 308, it is reflected with an angle dependent on the MEMS tilt setting. In the case depicted on the figure, the mirror sends the beam 307-3 upwards. It strikes the upper portion of the cylindrical lens 308 and is routed back to the waveguide device 304. With proper selection of the tilt angle of the MEMS 309-3, the beam 307-3 is precisely aligned to the waveguide dispersive element 305a. Because of the telecentricity of the 4f system, the beam 307-3 is incident onto the waveguide dispersive element 305a with again 0 degree angle, which is required for efficient coupling at wavelength $\lambda_3$.

Once all beams 307-1 to 307-5 have re-entered the waveguide device 304 at their respective waveguide dispersive elements 305a to 305e (in a completely selectable manner), they are coupled to their respective optical ports 301a to 301e.

FIG. 3B shows a side view of the embodiment of FIG. 3A. This shows clearly that cylindrical lens element 303 is substantially re-focussing the light beam between ports 301a to 301e and the waveguide device 304, while cylindrical elements 302a to 302e have virtually no impact on the light beam in the plane of the figure. The same holds true for cylindrical lens 306 used to substantially collimate light beams 307-1 to 307-5 upon exit of the waveguide device 304, while cylindrical lens 308 has virtually no effect on light propagation in the plane of the figure.

In the above embodiment, the routing elements are set to direct substantially all the light of a given wavelength channel towards the selected output port. In another embodiment, one or more of the routing elements are adapted to controllably misdirect a given wavelength channel such that only part of the light is directed to the selected output port, the rest being lost. This allows a wavelength channel specific attention function to be realized. In yet another embodiment, one or more of the routing elements are adapted to misdirect a given wavelength channel such that substantially none of the light is directed to any output port. This results in a channel block capability. The modifications are also applicable to the below-described embodiments.

FIG. 4A shows a hybrid waveguide and MEMS ROADM 400 provided by another embodiment of the invention. The embodiment of FIG. 4A is similar to that of FIG. 3A described above. There are output ports 301a, 301b, 301d, 301e and input port 301c as before. However, in this embodiment there is no micro-optic coupling scheme provided external to the waveguide device for coupling light to and from the input ports to the waveguide device. Instead, a different waveguide device, generally indicated at 404 is provided. This waveguide device is the same as the device 304 of FIG. 3A with the exception of the fact that it includes integrated coupling optics 402a, 402b, 402c, 402d, 402e for coupling to and from the waveguide arrays, now designated as 405a through 405e of waveguide device 404, and the ports 301a through 301e. the remainder of the structure and operation of the embodiment of FIG. 4A is the same as that described above for FIG. 3A. This enables a more compact design with a more stable relative alignment. It is to be understood that arbitrary arrangements of add and drop ports can be provided without departing from the scope of the invention.

This coupling optics 402 for each waveguide array of dispersive elements consists of a slab waveguide ending on an arc where the waveguide array of dispersive elements is connected. This arrangement is known to one skilled in the art as a star coupler (C. Dragone, IEEE Photonics Technology Letters, Vol. 1, No. 8, pp. 241–243, August 1989).

FIG. 4B is a side-view of the embodiment of FIG. 4A.

Figure 5B:
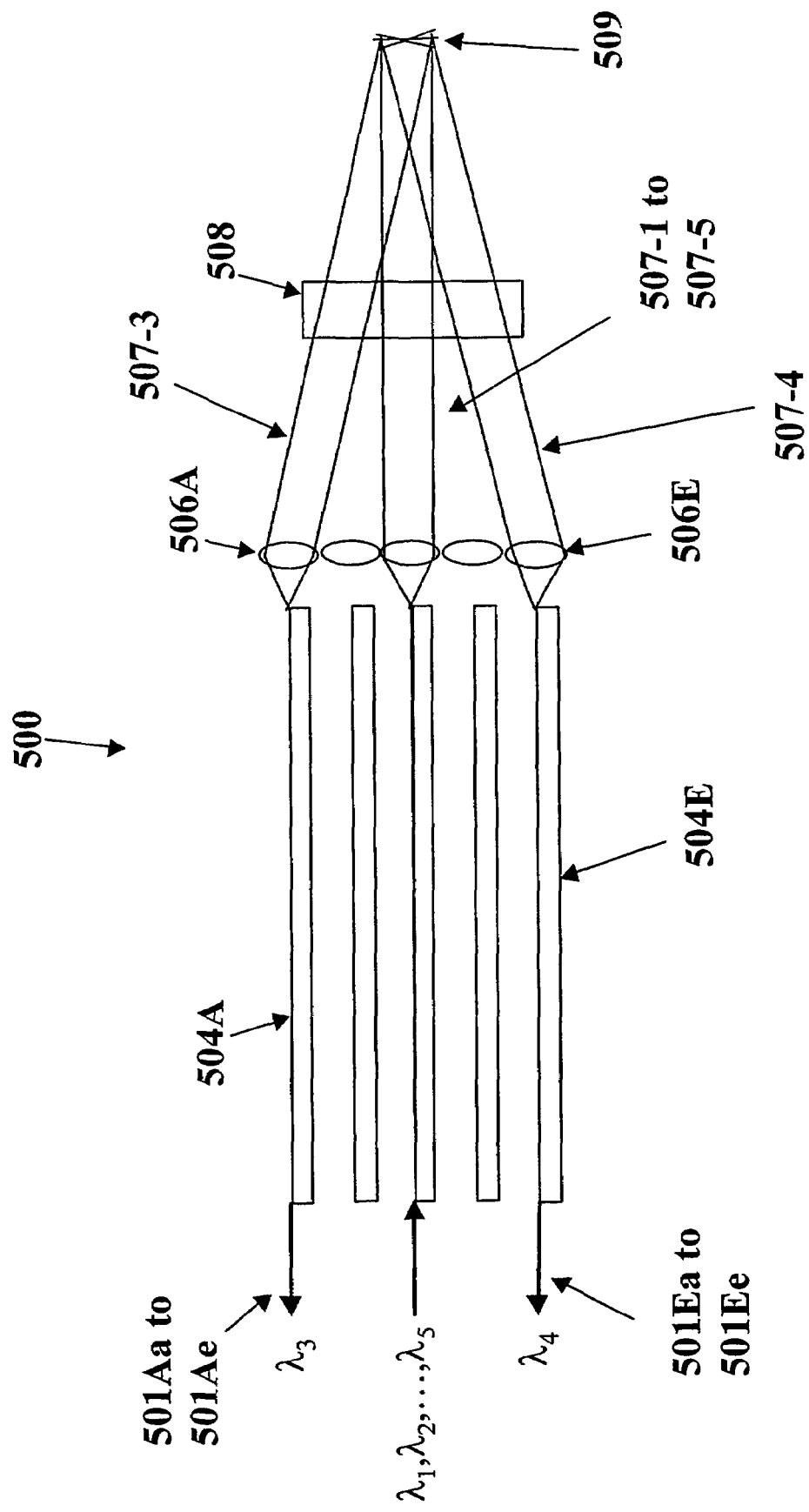
FIG. 5B is a side view of the embodiment of FIG. 5A.

Referring now to FIGS. 5A and 5B, an alternate embodiment of the invention employs a stack of waveguide devices 504A to 504E. This enables the number of optical ports to be greatly increased. Although the example shown in FIGS. 5A and 5B contains only five stacked waveguide devices 504A to 504E, yielding 5×5=25 optical ports (from 501Aa to 501Ee), it is to be understood that any arbitrary number of such stacked waveguide devices can be used by proper design of the associated optics elements 506A to 506E and bulk optical element 508, and by providing switching means 509 capable of switching in two dimensions with a large enough tilt angle. Similarly, the choice of a 5 wavelength channels system is arbitrary and any larger or lower number of wavelengths can be routed in the multi-ROADM device 500 by appropriate design of the waveguide dispersive elements 505. In the description of FIGS. 5A and 5B, capital letters A to E refer to vertical axis (plane of FIG. 5B), while lower case letters a to e refer to horizontal axis (plane of FIG. 5A).

The stacked arrangement of FIGS. 5A and 5B include a respective waveguide device 504A through 504E for each layer. Layers 504A, 504B, 504D and 504E have respective sets of output ports. The output ports of device 504A are ports 501Aa through to 501Ae. Similarly the output ports of device 504E are ports 501Ea through to 501Ee. The waveguide device 504C also has an input port. The input port for device 504C is port 501Cc. The remaining ports 501Ca, 501Cb, 501Cd and 501Ce of device 501C are output ports. Thus, there is an array of 25 ports, one of which is an input port (501Cc) and 24 of which are output ports. This is an example configuration used for description of the invention. Other combinations of input and output ports are possible without departing from the spirit of the invention. In the illustrated embodiment, there is one input port and the remaining ports are output ports. In another embodiment, all of the ports are input ports except one which is an output port. In yet another embodiment, there are multiple input ports and multiple output ports. This last arrangement is not fully non-blocking. Each device 504A to 504E functions in the same manner as device 404 of FIG. 4. The arrangement 500 further includes for each waveguide device 504A through 504E a respective cylindrical lens 506A through 506E. There is also provided a single bulk optical element 508. There is an array of switching elements 509 shown most clearly in the view of FIG. 5A, each of which are capable of tilting in two dimensions, including tilting in the plane of FIG. 5A, and tilting in the plane of FIG. 5B. Tilting in the plane of 5A allows switching between different ports of the same device 504A to 504E and tilting in the plane of FIG. 5B allows switching between ports of different waveguide devices.

Each of the ports (both input and output) are coupled to a respective integrated coupling optics on one of the devices 504A through 504E. For example, output port 501Aa is coupled to integrated coupling optics 502Aa. It is noted that the embodiment of FIG. 5A could be implemented using optical elements such as those used in the embodiment of FIG. 3A, instead of using the integrated optics as shown in the illustrated example.

By way of example, a DWDM light beam containing wavelengths $\lambda_1 \ldots \lambda_5$ is shown input into the multi-ROADM device 500 at input port 501Cc. It is coupled to a waveguide dispersive element 505Cc of waveguide device 504C through integrated coupling optics 502Cc. The waveguide dispersive element consists of an array of waveguides having a predetermined optical length difference causing a wavelength dependent exit angle of the light upon exit of the waveguide device 504C. Therefore, the light is demultiplexed in 5 beams comprising respectively $\lambda_1$ to $\lambda_5$ referenced 507-1 to 507-5. On FIG. 5A, only beams 507-2 to 507-4 are shown for clarity. Those beams are substantially collimated in the plane perpendicular to the plane of the figure upon traversing cylindrical lens 506C, while being-virtually unaffected in the plane of the figure. The main cylindrical lens 508 is used to route each beam 507-1 to 507-5 to a corresponding switching element 509-1 to 509-5, while virtually not impacting light propagation in the plane perpendicular to the plane of the figure. Those switching elements preferably consist of an array of tiltable mirrors capable of tilting both in the plane of the figure and in the perpendicular plane. When the mirrors are tilted in the plane of the figure, the light beams 507 can be routed to a particular horizontal location a to e. When the mirrors are tilted in the perpendicular plane, the light beams 507 can be routed to a particular waveguide device 504A to 504E in the waveguide stack 504. Therefore, an appropriate combination of tilt in the plane of the figure and perpendicular to the plane of the figure enables to route each beam 507-1 to 507-5 to any of the 25 possible waveguide dispersive elements 505Aa to 505Ee. In a preferred embodiment, the main cylindrical lens 508 is placed in-between the waveguide stack 504 and switching array 509 such that both the waveguide stack 504 and the switching array 509 lie in the vicinity of the focal plane of cylindrical lens 508. This arrangement guarantees that irrespective of the tilt of the MEMS mirrors 509-1 to 509-5, light beams 507-1 to 507-5 will always have an incident angle in the plane of the figure into any of the waveguide dispersive elements 505Aa to 505Ee that maximizes the coupling (i.e. the incident angle is substantially the same as the angle upon exit of the input waveguide dispersive element 505Cc).

The array of cylindrical lenses 506A to 506E is used to refocus and steer the light beams 507-1 to 507-5 to their respective waveguide device 504A to 504E depending on the switching pattern. In the case of the FIGS. 5A and 5B, $\lambda_3$ has been arbitrarily switched from waveguide dispersive element 505Cc to waveguide dispersive element 505Aa, $\lambda_4$ has been switched from 505Cc to 505Ee and $\lambda_2$ has been switched from 505Cc to 505Cb. After being coupled to their respective waveguide dispersive element 505, the light beams 507 are brought to their respective optical ports 501 through integrated coupling elements 502. In the particular case of the figure, the 3 depicted wavelengths $\lambda_2$ to $\lambda_4$ exit at respectively optical ports 501Cb, 501Aa, and 501Ee.

Referring again to FIG. 5B an important point on this figure is the arrangement of the array of cylindrical lenses 506A to 506E used to substantially collimate light beams 507-1 to 507-5 exiting from the waveguide dispersive element 505Cc in the plane of the figure, while not affecting light propagation in the perpendicular plane and used to substantially re-focus light beams 507-1 to 507-5 when they re-enter their respective waveguide dispersive element 505Aa to 505Ee depending on their switching pattern. The optical centre of cylindrical lenses 506A to 506E are aligned such that a 0 degree angle of incidence to the waveguide devices 504A to 504E is obtained when the switching mirrors 509 are tilting in the plane of FIG. 5B. For the particular embodiment depicted on FIGS. 5A and 5B, this is done by offsetting the centre of cylindrical lenses 506A, 506B, 506D and 506E by an appropriate amount.

Figure 6A:
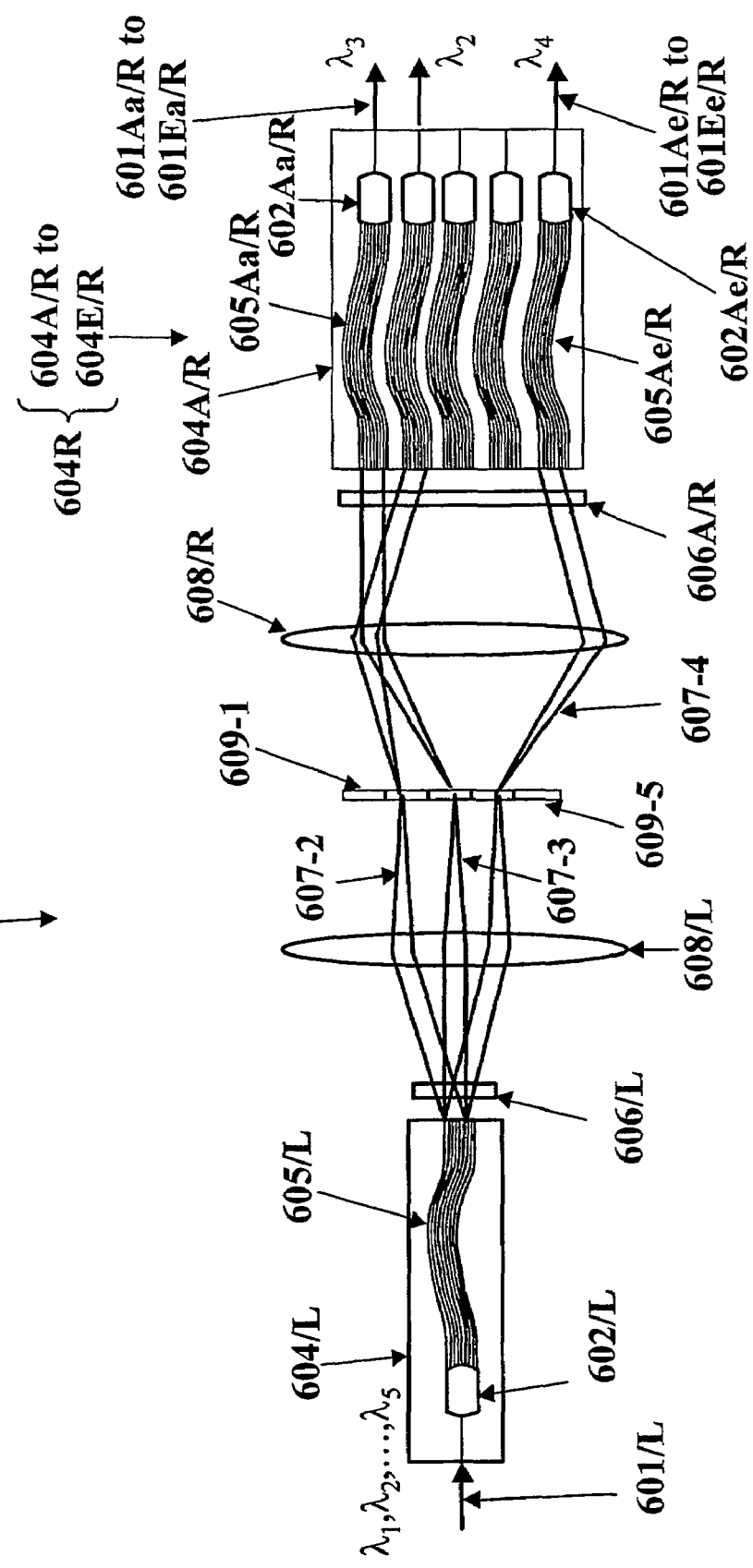
FIGS. 6A and 6B is a layout view of an embodiment of the invention where two waveguide devices or waveguide device stacks are used in conjunction with transmissive switches capable of steering light beams in two dimensions.
Figure 6B:
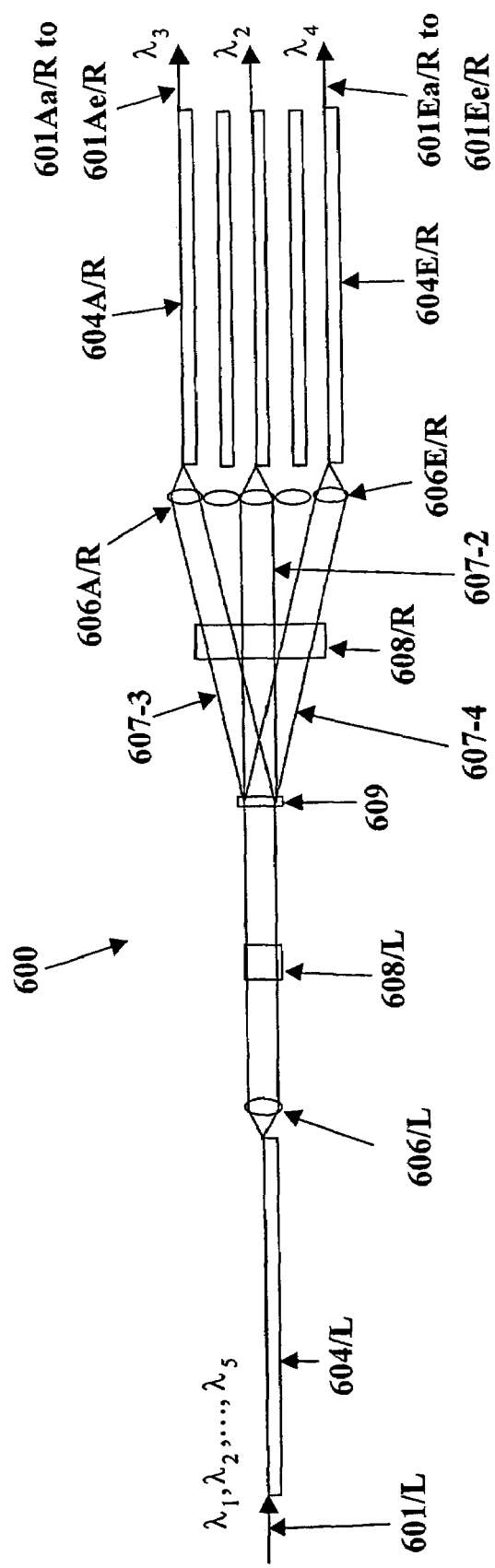

FIGS. 6A and 6B show another embodiment of the invention which features transmissive switching elements. This embodiment basically consists of the input port functionality of FIG. 4 on one side of an array of transmissive switching elements, on the other side of which is output port functionality analogous to that provided by device 500 of FIG. 5A. Other embodiments like a 400 type device connected to another 400 device, or a 500 type device connected to another 500 type device are possible, but are not shown.

FIG. 6A shows a top view of a transmissive multi-ROADM device 600 comprising a left part (with elements labelled with the suffix "/L" in the description) and a right part (with elements labelled with the suffix "/R" in the description) connected through an array of transmissive switching means 609. A DWDM multiplexed light beam comprising wavelengths $\lambda_1 \ldots \lambda_5$ is input to the transmissive multi-ROADM at input port 601/L. It is coupled to waveguide dispersive element 605/L through integrated coupling element 602/L. Due to the dispersion imparted by waveguide dispersive element 605/L, the light exits the waveguide device 604/L with an angle dependent on wavelength. For clarity, only three wavelengths are shown as beams 607-2 to 607-4 corresponding to $\lambda_2$ to $\lambda_4$ respectively, although all five wavelength channels are present. The light beams 607-1 to 607-5 are substantially collimated in the plane perpendicular to the plane of the figure by cylindrical lens 606/L. The main cylindrical lens 608/L is used to route the different wavelength channels to a transmissive switching means array 609-1 to 609-5. These switching elements are capable of steering a light beam in transmission. For example, an optical phase array, an electro-hologram or other phase elements are known by one skilled in the art to provide this steering function. After being steered by the transmissive switching means 609-1 to 609-5, the light beams 607-1 to 607-5 are directed towards the waveguide stack 604/R by the main cylindrical lens 608/R. Preferably, the main cylindrical lenses 608/L and 608/R are assembled to provide a 4f system, whereby the waveguide device 604/L and the array of switching means 609 are lying on the focal planes of cylindrical lens 608/L and the array of switching means 609 and the waveguide stack 604/R are lying on the focal planes of cylindrical lens 608/R. This arrangement guarantees that irrespective of the switching performed by switching elements 609, every wavelength channel 607-1 to 607-5 has the proper angle of incidence in the plane of the figure to maximize coupling into the waveguide stack 604/R. In the particular case when lens 608/L and 608/R have the same focal length, this corresponds to the angles of incidence to the waveguide stack 604/R being opposed to the exit angles from waveguide device 604/L and the waveguide dispersive elements 605/R being mirror images of the waveguide dispersive element 605/L. Other combinations using different focal lengths for cylindrical lenses 608/L and 608/R and different designs for waveguide dispersive elements 605/L and 605/R are possible by proper design. The array of cylindrical lenses 606A/R to 606E/R is used to refocus the light beams 607-1 to 607-5 into their respective waveguide dispersive element 605/R depending upon switching. In the example shown on FIG. 6, the wavelength channels $\lambda_2$ to $\lambda_4$ are arbitrarily routed respectively to waveguide dispersive elements 605Cb/R, 605Aa/R and 605Ee/R. After being routed to their respective waveguide dispersive elements, the light beams 607-1 to 607-5 are connected to their respective optical ports 601/R through respective integrated coupling means 602/R.

FIG. 6B shows a side view of the embodiment of FIG. 6A. It shows in particular that the cylindrical lens 606/L is used to substantially collimate the light beams 607-1 to 607-5 exiting the waveguide device 604/L. After traversing the array of transmissive switching means 609, the light beams 607-1 to 607-5 are steered in two dimensions. In the plane of FIG. 6B, the beam 607-3 is tilted upwards towards waveguide device 604A/R, the beam 607-4 is tilted downwards towards waveguide device 604E/R, while the beam 607-2 is not deflected and is connected to waveguide device 604C/R. In order to couple efficiently to their respective waveguide device 604/R, the light beam 607-1 to 607-5 are re-focussed through the array of cylindrical lenses 606/R. In order to couple efficiently to waveguide device 604/R, it is also necessary that the light beams 607-1 to 607-5 be parallel to the substrates of their corresponding waveguide devices 604/R. This is achieved by proper positioning of the optical centre of cylindrical lenses 606/R. In the example shown on FIG. 6B where all waveguide substrates 604A/R to 604E/R are parallel and horizontal, this is achieved by having the optical centre of cylindrical lenses 606A/R, 606B/R, 606D/R, and 606E/R offset by a proper amount compared to the waveguide core locations.

Figure 7:
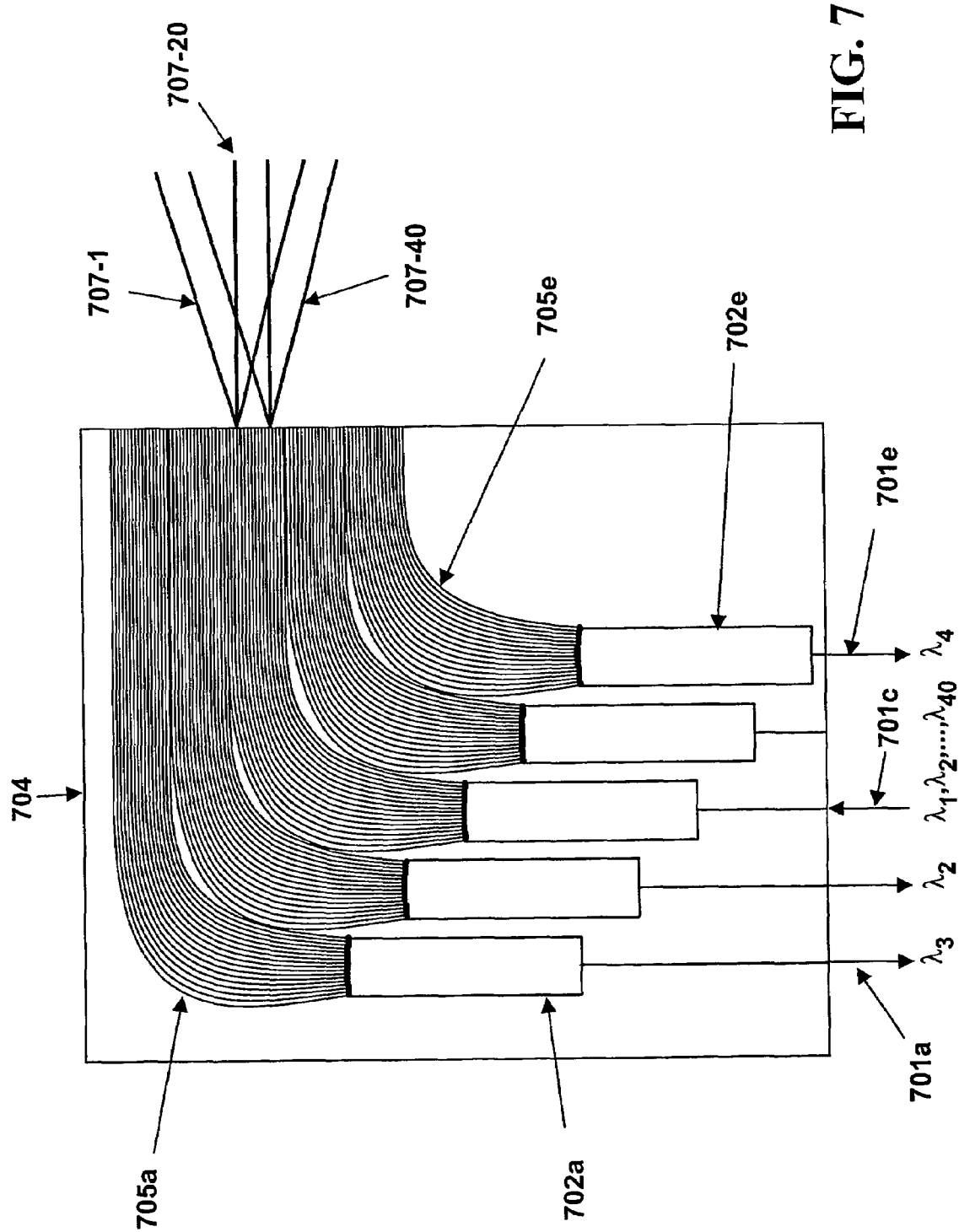
FIG. 7 is a schematic layout view of the waveguide device of the hybrid waveguide and MEMS ROADM of FIG. 4A designed for 40 wavelength channels at 100 GHz spacing.

FIG. 7 shows an example schematic layout of a waveguide device 704 containing an array of waveguide dispersive elements 705 designed for a 40 channels system with 100 GHz spacing. This might be used to implement waveguide device 404 of FIG. 4A or devices 504A through 504E of FIG. 5A for example. The waveguide device 704 consists of optical ports 701a to 701e coupled to waveguide dispersive elements 705a to 705e through integrated coupling elements 702a to 702e. The coupling elements 702a to 702e each comprise a free propagating region in the plane of the figure, guiding the light only in the perpendicular plane. The length of this free propagation region in this example is 13.63 mm, ending with an arc of 13.63 mm radius of curvature. The waveguide dispersive elements 705a to 705e each consist of an array of 250 waveguides (not all shown) connected at one end to this arc with a spacing of 12 microns and on the other end to the facet of the waveguide device 704 with a spacing of 12 microns. The 250 waveguides are arranged such that there is a constant physical path length difference between each consecutive waveguide of 25.55 microns. With these design parameters, a 40 channel 100 GHz spacing DWDM multiplexed light beam input at 701c into the waveguide device 704 is demultiplexed into 40 light beams 707-1 to 707-40 upon exit of the waveguide dispersive element 705c with an angle depending on wavelength of about 1.4 radian per micron. The derivation of the chosen design parameters are similar to those required for an AWG and is known to one skilled in the art (see for example H. Takahashi et al., Journal of Lightwave Technology, Vol. 12, No. 6, pp. 989–995, 1994) with the only difference that the array of waveguides 705 ends on the straight facet of waveguide device 704.

Figure 8A:
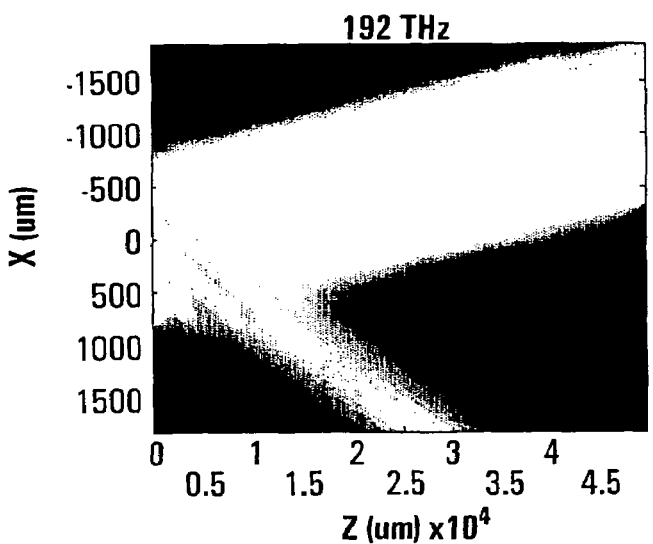
FIGS. 8A, 8B and 8C show an example of the modelled far field of the light exiting the waveguide device of FIG. 7 when a light beam at 192 THz, 194 THz and 196 THz is launched through the middle waveguide dispersive element.
Figure 8B:
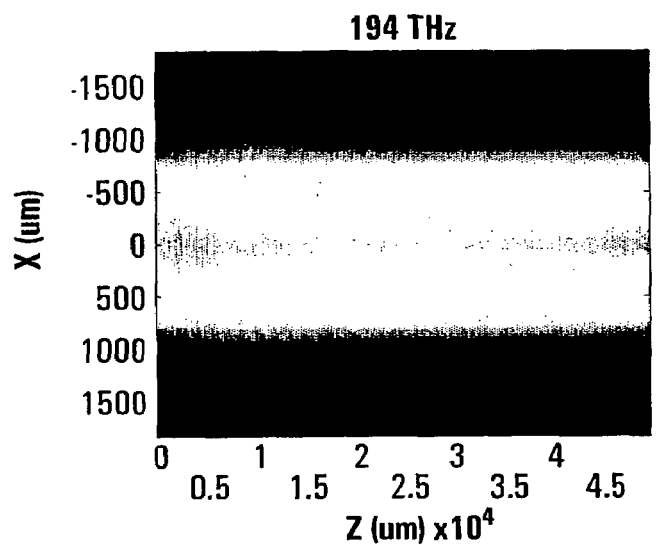
Figure 8C:
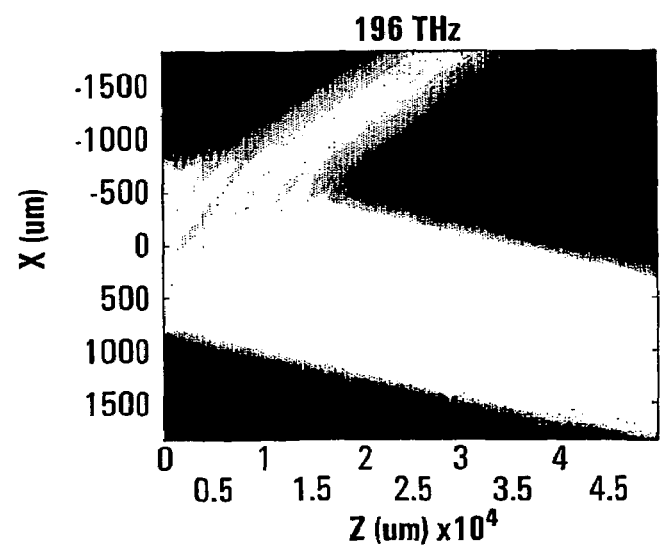

FIG. 8A to FIG. 8C show an example of the far field of light beams 707-1, 707-20 and 707-40 emitted from the waveguide dispersive element 705c designed according to parameters mentioned in the above description of FIG. 7 for three different wavelengths of light corresponding to a frequency of 192 THz ($\lambda_1$=1561.419 nm), 194 THz ($\lambda_{20}$=1545.322 nm) and 196 THz ($\lambda_{40}$=1529.553 nm) respectively. As can be seen on the graph, the light is substantially collimated in the plane of the figure (which is also the plane of FIG. 7) and has an angle of incidence exiting the waveguide device 704 depending on wavelength.

Figure 9B:
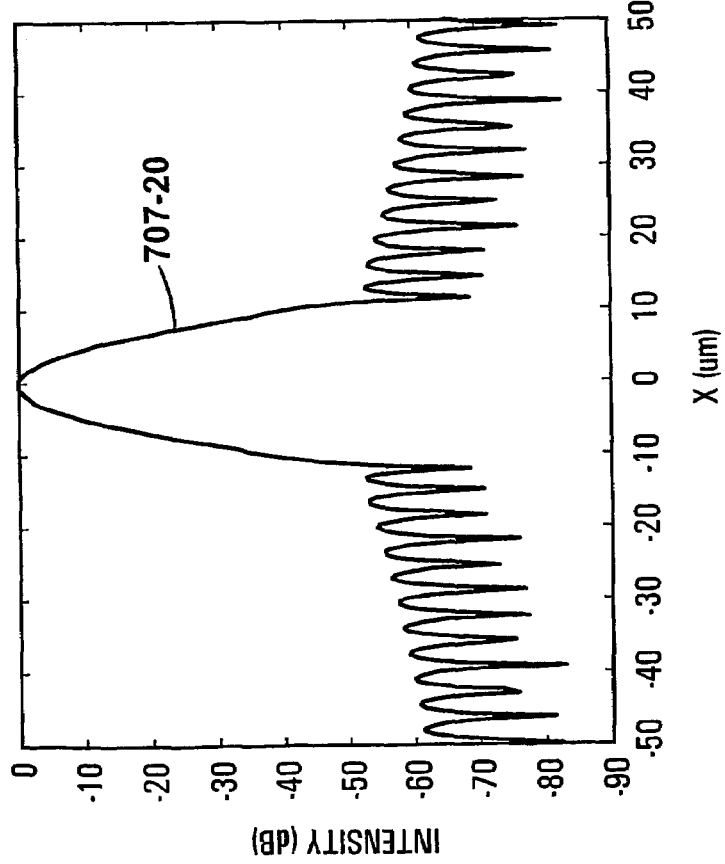
FIG. 9B shows a superposition of near fields close to the MEMS array for light at 192 THz, 194 THz and 196 THz.
Figure 9A:
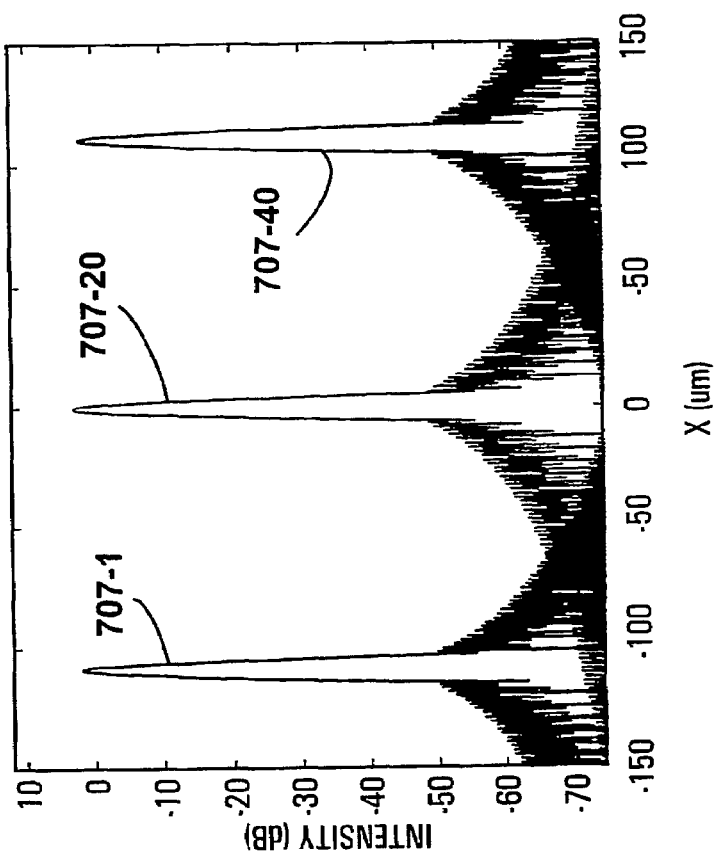
FIG. 9A shows an example of a modelling of the near field close to the MEMS array for an input light beam at 194 THz after being focused through a cylindrical lens.
Figure 11:
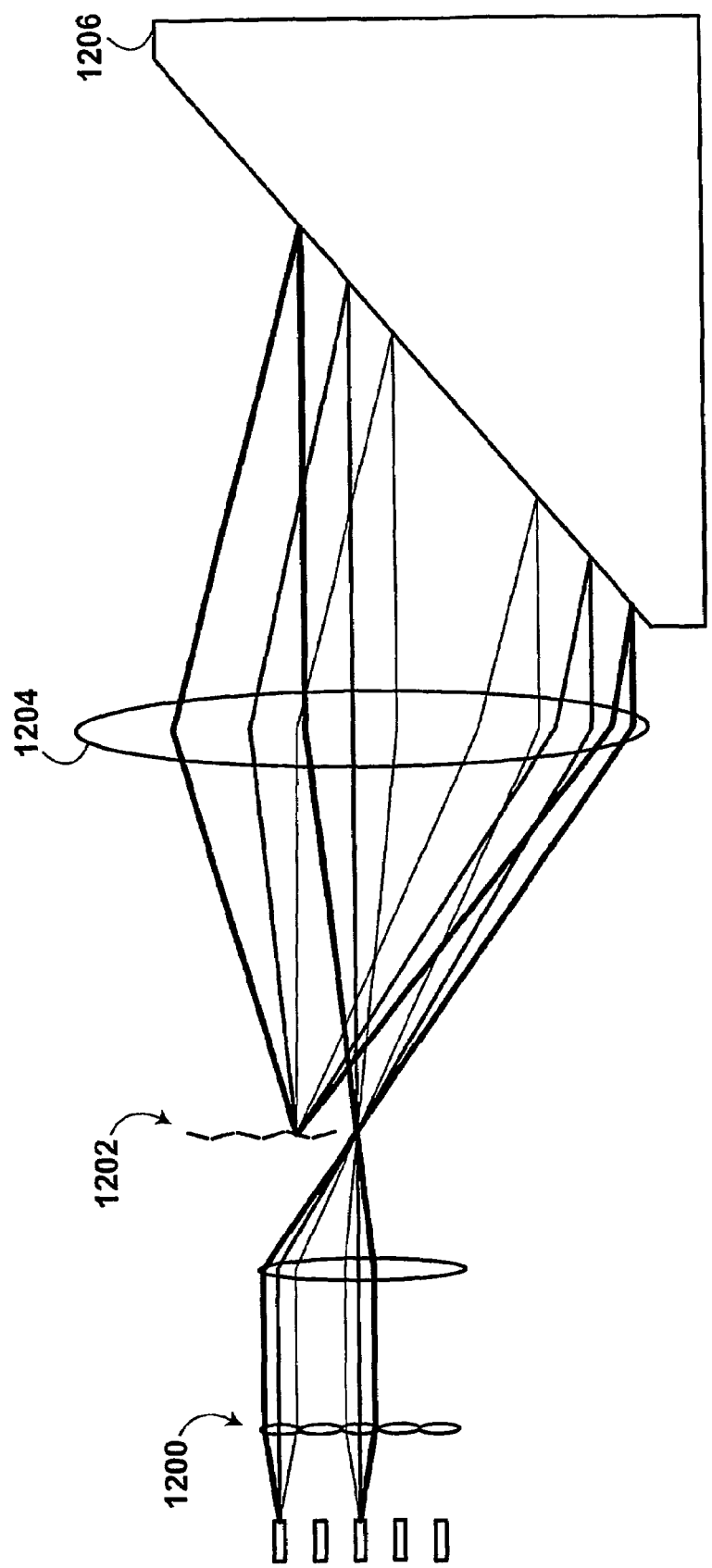
FIG. 11 is a system diagram of another conventional multi-wavelength switch featuring a single diffraction grating.

FIG. 9A shows the beam 707-20 after being focussed through a lens with an effective focal length of 5 mm. This focussing would typically result from traversing cylindrical lens 408 in the preferred embodiment described in FIG. 4A, although in this last case, the effective focal length of the main cylindrical lens 408 could differ depending on the limitation in the minimum spacing of the switching elements 409 with typical practical focal length ranging from 60 mm to 150 mm. The focal length of lens 306 is then determined to enable beam propagation from waveguide element 404 to switching elements 309. This would typically require a focal length of between 2 and 5 mm. These are example ranges only. Actual values can be determined on a per application basis.

FIG. 9B shows the same data as FIG. 9A, superimposing focussed beams 707-1, 707-20 and 707-40.

FIG. 10A shows the top view of another embodiment as per the invention generally indicated at 1000. This embodiment is similar to that of FIG. 4A in that a set of ports 301a through 301e are provided which are connected through integrated optical coupling means to waveguide arrays. In this example, the integrated coupling means are designated with reference numerals 1002a through 1002e and the waveguide arrays are designated as 1005a through 1005e, forming part of a waveguide device 1004. This embodiment differs from that of FIG. 4A in that there is no main cylindrical lens element 308, but rather the functionality of that lens is integrated with the waveguide dispersive elements. This is achieved by putting the appropriate phase profile inside the waveguide dispersive element. In the case of a waveguide array, this is usually achieved through the addition of an extra parabolic phase term to the linear phase term required for dispersion only. Such a focussing and dispersive arrangement of a waveguide element is described, for example, in: M. K. Smit, Electronics Letters, Vol. 24, pp. 385–386, 1988. In the particular case of the present invention though, the focussing parameters of each of the waveguide dispersive element array 1005a to 1005e have to be computed such that all wavelengths channels 1007-1 through 1007-4 are focussed to the same point on the switching array 1009-1 to 1009-5. This is achieved by putting an appropriate offset in the parabolic phase profile for each respective waveguide dispersive element. Cylindrical lens 1006 performs the same function as lens 306 of FIG. 4A. For the description of FIG. 10A, a five wavelengths system has been shown with an array of five waveguide dispersive elements, although other combinations are possible.

By way of example, an optical signal containing $\lambda_1$ to $\lambda_5$ is input to the wavelength switch device 1000 through optical port 301c. It is coupled to integrated lens-waveguide dispersive element 1005c of waveguide device 1004 through integrated coupling optics 1002c. The preferred embodiment of the waveguide dispersive element is an array of waveguide having a predetermined phase relationship with each other. The linear term in this phase profile accounts for dispersion, while the second order terms add focussing power. Therefore, the light beams exiting the waveguide device 1004 have a diversity of angles depending on wavelengths and are all focussed on the focal plane of integrated lens-waveguide dispersive element 1005c. For clarity, only three such beams 1007-2 to 1007-4 are shown on the figure. While the beams are focussed in the plane of the figure through the non-linear phase profile imparted on the array of waveguides constituting the integrated lens-waveguide dispersive element 1005c, the light beams 1007-1 to 1007-5 are diverging in the plane perpendicular to that of the figure. Therefore, a cylindrical lens 1006 is provided that collimates the beam 1007-1 to 1007-5 in the plane perpendicular to that of the figure, while substantially not affecting light propagation in the plane of the figure. In the plane of the figure, there is no optical element having power, therefore this region labelled 1010 is referred to as a free-space propagation region. As mentioned above, all integrated lens-waveguide dispersive elements 1005a to 1005e are designed such that all wavelengths channels are focussed onto the same point irrespective of the lens-waveguide dispersive elements they are propagating through. This is achieved through appropriate design of the non-linear terms within the phase profile inside each of the waveguide array constituting the integrated lens-waveguide dispersive elements 1005a to 1005e. In particular, the switching means array 1009-1 to 1009-5 is lying substantially in the common focal plane of these integrated lens-waveguide dispersive elements 1005a to 1005e.

The switching means 1009-1 to 1009-5 are shown on FIG. 10A as micro-mirrors, although other arrangements are possible with transmissive switching means for example. Upon tilting of the micro-mirrors, the light beams 1007-1 to 1007-5 can be routed from the middle integrated lens-waveguide dispersive element 1005c to any of the array of integrated lens-waveguide dispersive elements 1005a to 1005e. With the particular geometry chosen for this embodiment, the coupling efficiency is maximum. This will be explained in the case of light beam 1007-2, but is true simultaneously for all light beams 1007-1 to 1007-5.

Light beam 1007-2 corresponds to wavelength channel $\lambda_2$ as it exits the waveguide device 1004 through the end facet of integrated lens-waveguide dispersive element 1005c. Given the design parameters mentioned above, it is focussed on switching element 1009-2. If this light beam would have originated from integrated lens-waveguide dispersive element 1005b, it would also have been focussed to switching element 1009-2, due to the particular of the optical design of the integrated lens-waveguide dispersive element 1005b. Therefore, one can establish an optical path from 1005c to 1005b for wavelength channel $\lambda_2$ by tilting micro-mirror 1009-2 by an appropriate amount. This is essentially true for all wavelength channels and all integrated lens-waveguide dispersive elements.

Upon coupling back to waveguide device 1004, the light beams 1007-1 to 1007-5 are connected to their respective output ports 301a to 301e depending on the switching pattern chosen for switch array 1009, through integrated optics coupling means 1002a to 1002e. In the case shown on FIG. 10a, wavelength channel $\lambda_2$ is directed to port 301b, wavelength channel $\lambda_3$ is directed to port 301a and wavelength channel $\lambda_4$ is directed to port 301e.

FIG. 10B shows a side view of the embodiment shown on FIG. 10A. In this case, there is only one cylindrical lens 1006 used to substantially collimate light beams 1007-1 to 1007-5 upon exit of the waveguide device 1004 and to re-focus them on their way back to waveguide device 1004.

Figure 12:
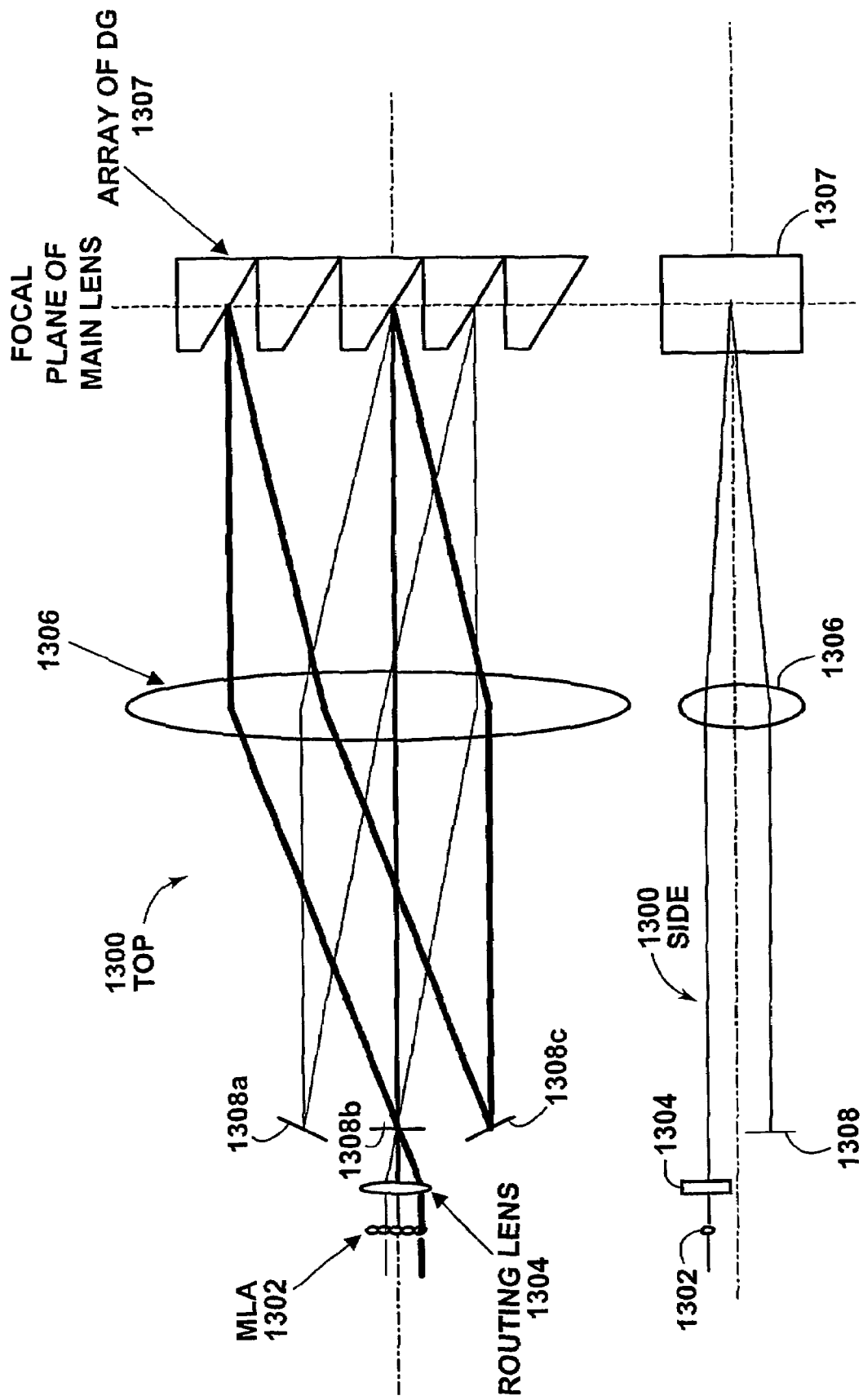
FIG. 12 is a system diagram of a wavelength selective switch employing free-space elements and an array of diffraction gratings, provided by an embodiment of the invention.

Referring now to FIG. 12, shown is a system block diagram of a free-space embodiment of a wavelength selective optical switch provided by the invention. This embodiment employs an array of reflective diffraction gratings instead of waveguide devices as employed in the previous embodiments. More generally, non-transmissive dispersive elements can be employed with this arrangement. The figure shows a set of MLA's (microlens array) 1302, the output of which passes through a routing lens 1304. The top view of the device is generally indicated at 1300TOP and the side view is generally indicated at 1300SIDE.

The output of the routing lens 1304 passes through free-space to a main lens 1306 which routes each of the ports to a respective diffraction grating forming part of an array of diffraction gratings 1307. The array of diffraction gratings reflect the incoming light of each port according to wavelength. There is an array of switching means 1308 shown to consist of tiltable mirrors 1308a, 1308b and 1308c. There would be a respective switching element for each wavelength. It is noted that the switching elements 1308 are not in the same horizontal plane as the routing lens 1304. This can be most clearly seen in the side view 1300SIDE. Each switching element performs a switching of light of a given wavelength from one input port to another optical port by tilting of the mirror.

The operation of FIG. 12 is similar to that of previous embodiments. One of the ports is designated as an input port and the other ports are output ports. By appropriate tilting of the mirrors in array 1308, each wavelength of a multi-wavelength input signal received at the input port can be switched to any of the output ports.

Figure 13:
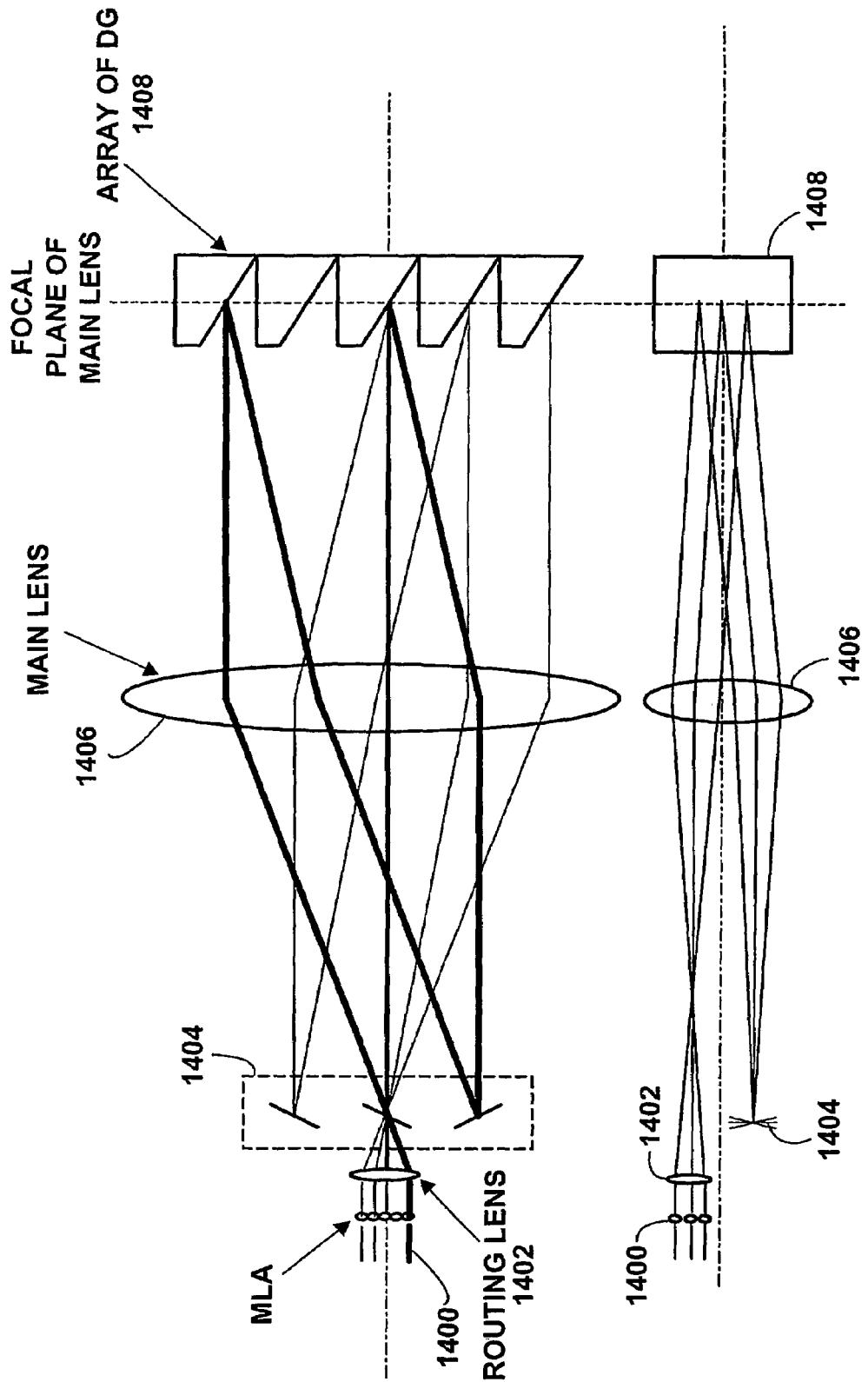
FIG. 13 is a system diagram of a wavelength selective switch employing free-space elements, an array of diffraction gratings and a 2D arrangement of optical ports, provided by an embodiment of the invention.

FIG. 13 is an implementation similar to that of FIG. 12 except that in this case, there is a two dimensional array of ports, generally indicated at 1400 optically connected through routing lens 1402 to the main lens 1406 and array of diffraction gratings 1408. Switching/routing is performed using routing elements generally indicated at 1404. This embodiment is similar functionally to the embodiment of FIG. 5A, but with diffraction gratings used as dispersive elements.

The above described embodiments have employed either an array of waveguides or diffraction grating as the dispersive elements. It is noted that any appropriate diffraction grating type might be employed. For example reflective, transmissive, echelle, echellon, or grisms, to name a few examples. Array waveguides and echelle waveguide gratings might be employed. Prisms might instead be employed for the dispersive elements. more generally, any dispersive element that can achieve the desired wavelength dependent function may be employed by embodiments of the invention.

The described embodiments have featured MEMS mirror arrays to perform the switching of wavelengths. More generally, any appropriate switching means may be used. For example, liquid crystal beams steering elements (phase array), accouto-optic beam deflectors, solid-state phase array, controllable holograms, periodically polled Lithium Niobate beam deflectors.

Figure 14:
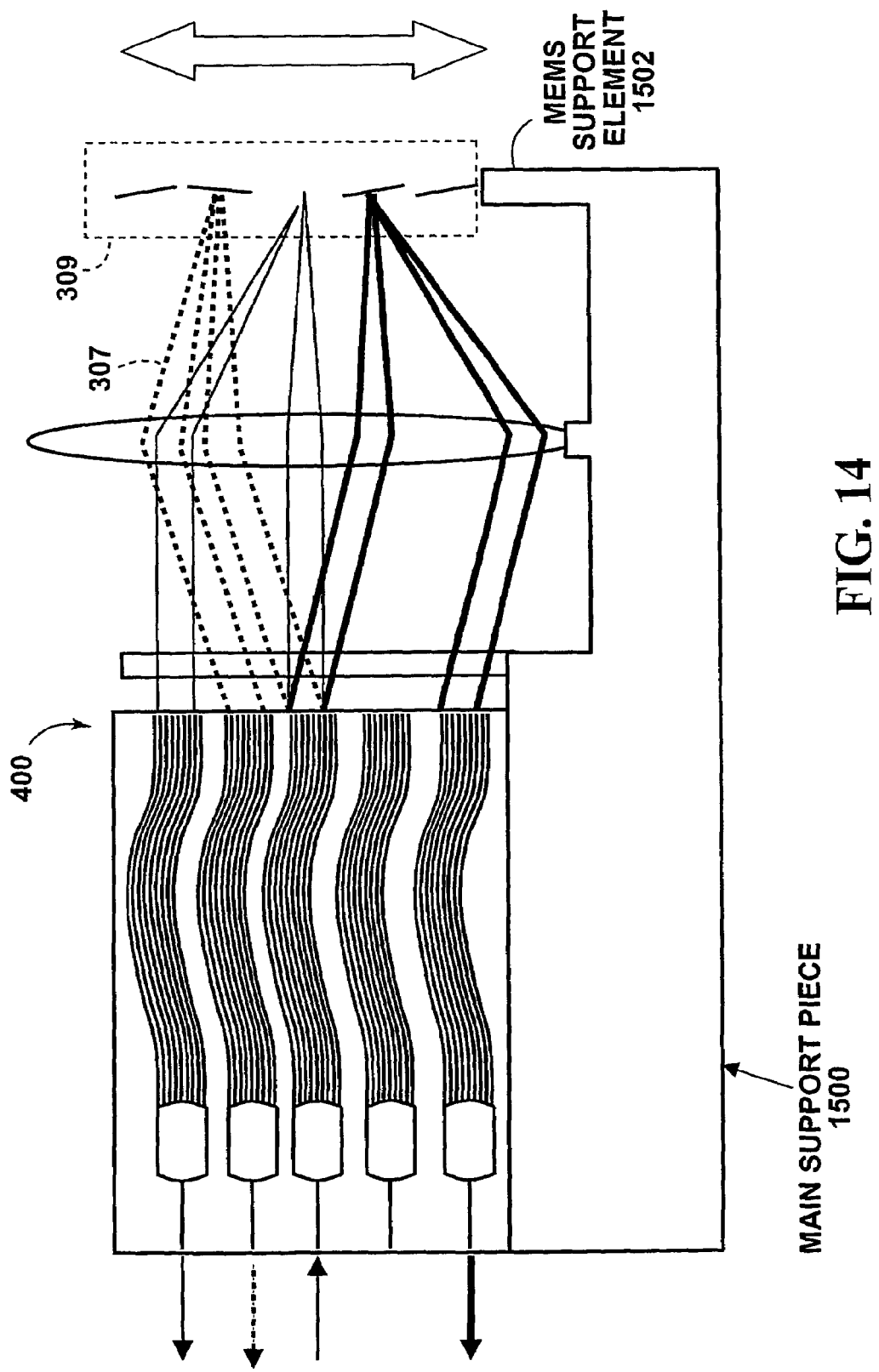
FIG. 14 is a system block diagram of a wavelength selective switch provided by an embodiment of the invention featuring temperature compensation elements.
Figure 15:
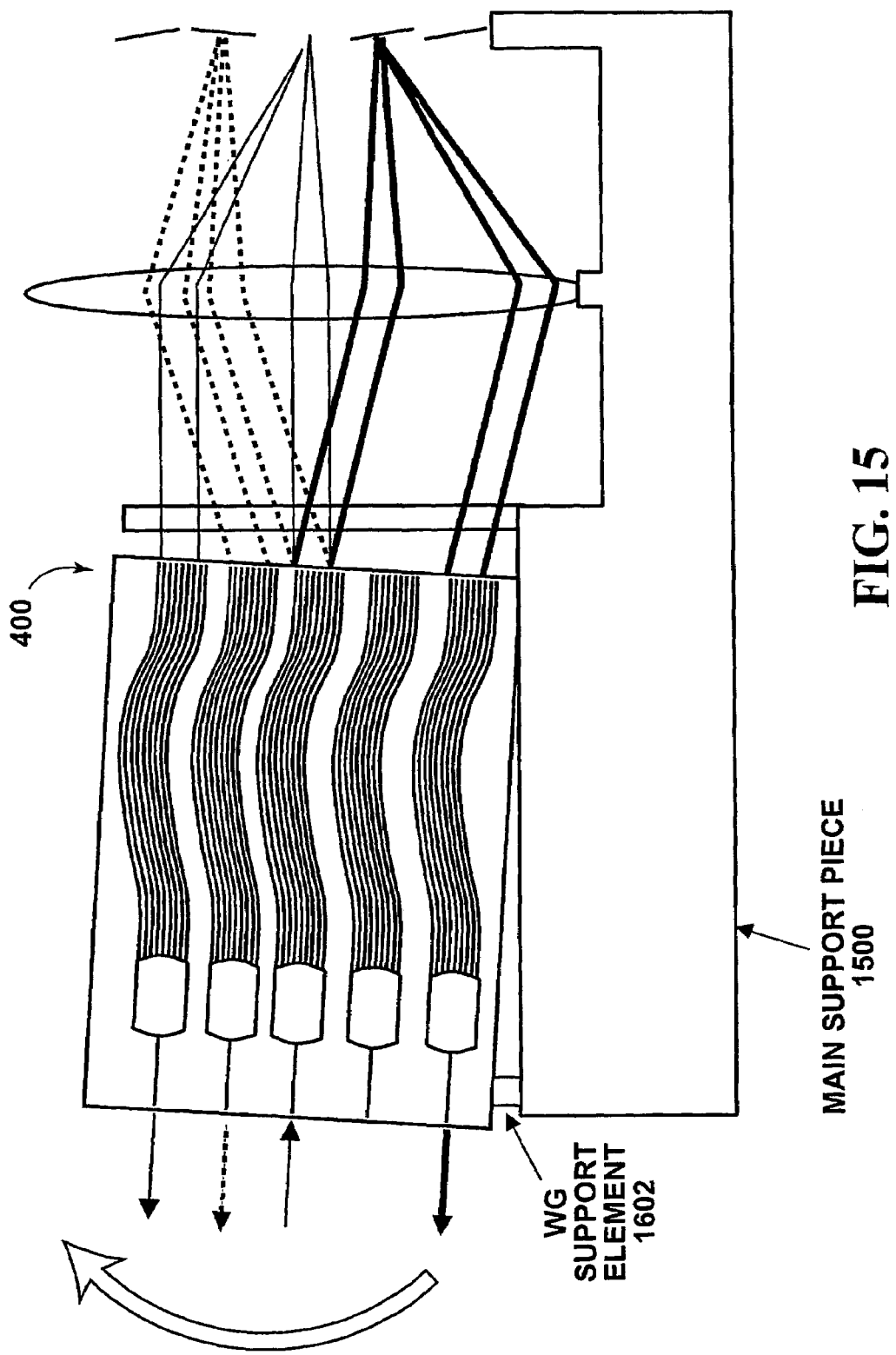
FIG. 15 is another embodiment of the invention featuring temperature compensation elements.
Figure 16:
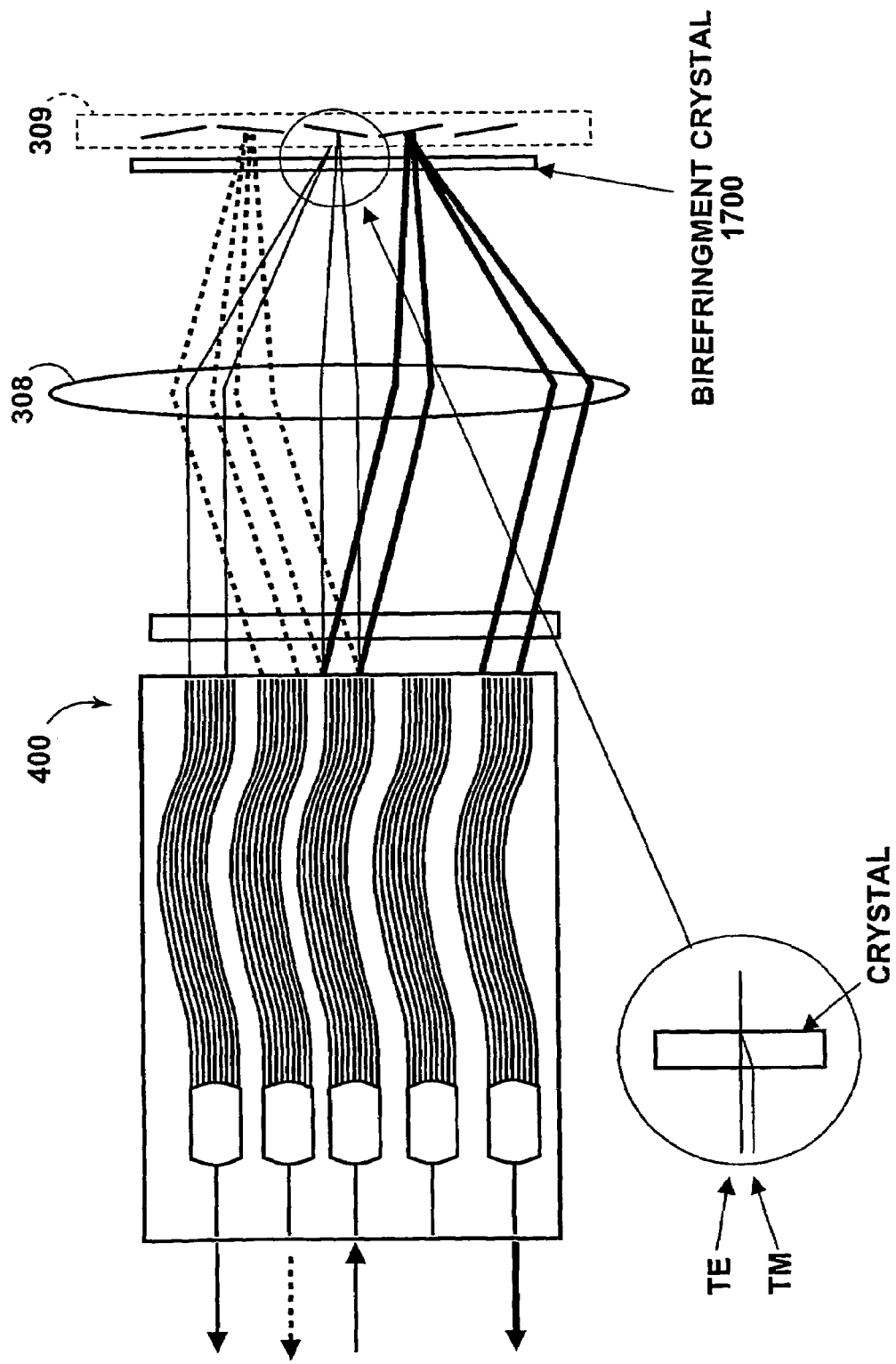
FIG. 16 is a system diagram of an embodiment of the invention featuring PD lambda compensation.

Since the index of refraction in waveguides is a function of temperature, the dispersive properties of the waveguide based dispersive element are varying with temperature, causing the beams of light for a particular channel to move away from its corresponding mirror center position. It is desirable to provide compensation for this variation as a function of temperature. One way to compensate for this effect is to mount the mirror array on some dual material mount, whereby the mirror array moves with the beams as the temperature changes. This is achieved for example when using a mount material for the main support piece that has the same coefficient of thermal expansion as Silicon, and putting an extra piece of high expansion material (for example Aluminum) between this main support piece and the MEMS mirror array. The exact dimension of this extra piece depends on the coefficient of thermal expansion of the material for this extra piece, on the focal length of the main cylindrical lens and on the dispersion characteristics of the waveguide dispersive element. An example of this is shown in FIG. 14 which shows the device 400 of FIG. 4 mounted on a main support piece 1500. The MEMS array 309 is mounted on a MEMS support element 1502 which moves the MEMS mirrors up and down as a function of temperature in sync with light beam 307. An alternative mount is shown on FIG. 15, in which the waveguide element itself is tilted in front of the optics assembly. Again, this is achieved by inserting an extra support piece 1602 having a different coefficient of thermal expansion than the main support piece at one end of the waveguide element. The exact dimension and location of this extra support element is designed as to cancel any temperature dependent dispersion variation with the net effect that the angle that a light beam of a particular wavelength enters and exits the waveguide element 400 is substantially constant over a wide temperature range. Both the embodiments of the FIGS. 14 and 15 can be employed with any of the wavelength selective switches described herein.

Figure 17:
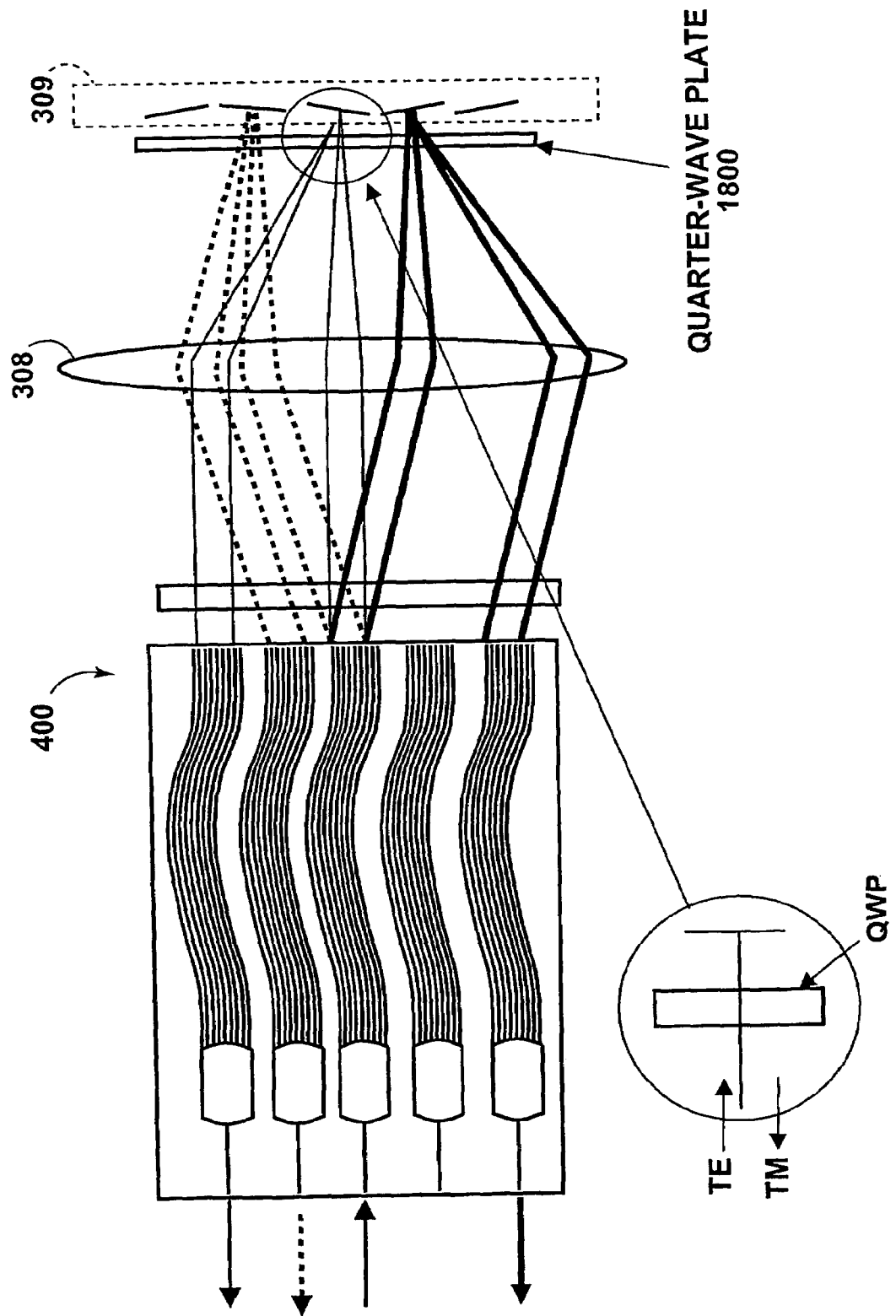
FIG. 17 is a system diagram of another embodiment of the invention featuring compensation for PDLoss.

In the presence of a small amount of residual birefringence in the waveguide dispersive element, the TE part of light beam and the TM part of a light beam of a particular wavelength do not exactly overlap on a mirror in the mirror array. To compensate for this effect, some embodiments feature a birefringent crystal beam displacer in the beam path to make the two TE and TM subbeams coincide on the array of mirrors. FIG. 17 shows an example of this applied to the embodiment of FIG. 4 again. A birefringent crystal 1700 is shown inserted between the main lens 308 and the array of MEMS mirrors 309. This modification can be employed for any of the above described embodiments.

In the presence of some small residual polarization dependence of any of the components in the device as per the invention, that manifests itself as a polarization dependent transmission efficiency through the device. In some embodiments, a quarter-wave plate is inserted in the optical path with the effect to swap TE and TM sub beams in the middle of the device. This causes the losses for the two polarization axis to be averaged out (TE/TM or TM/TE). An example of this is shown in FIG. 18 applied to the device 400 of FIG. 4. Here a quarter-wave plate 1800 is shown inserted between the main lens 308 and the array of MEMS mirrors 309.

Furthermore, although the preceding descriptions have only mentioned switching applications in which routing elements having a switching function are used to established re-programmable light paths, in other embodiments fixed arrangements are also possible to establish permanent light paths using routing elements which do not switch. The applications for such fixed devices would be for fixed demultiplexers, filters, band filters, interleavers, etc.

The above-described embodiments have all focused on the redirection of light from an input to an output port, thereby realizing wavelength selective switching. Another embodiment of the invention provides an integration platform having three or more ports, a dispersive element per port, and a bulk optical element having optical power in communication with all of the ports. An example implementation is the arrangement of FIG. 3 not including the switching elements. Such an arrangement can be employed for many purposes other than switching. For example, by replacing the switching elements with appropriate light processing elements, a channel selective filtering function, limiting, optical sensing, channel attenuation, polarization state change application can be achieved.

The invention is not intended to be limited to the above mentioned specific embodiments but should rather be understood as being within the scope of the appended claims.

The invention claimed is:

1. An apparatus comprising:
a plurality of optical ports including an input optical port for receiving an optical signal with a plurality of wavelength channels, and a plurality of output ports;
for each optical port, a respective waveguide dispersive element optically connected to the optical port, the dispersive elements integrated on a same waveguide device in a first plane;
a bulk optical element having optical power;
a plurality of non-transmissive routing elements;
wherein the dispersive element of the input port disperses each of the wavelength channels at a different respective exiting angle dependent upon wavelength,
wherein the bulk optical element redirects each one of the wavelength channels at a respective angle towards a respective one of said plurality of routing elements, and
wherein said plurality of routing elements directs each of the wavelength channels via the bulk optical element to a selected output port in the first plane via the respective dispersive element of the selected output at a respective angle of incidence dependent upon the selected output port.

2. The apparatus of claim 1, wherein at least one routing element is also controllable so as to redirect only a portion of one of the wavelength channels to realize an attenuation function.

3. The apparatus of claim 1, wherein at least one routing element is also controllable so as to redirect all of one of the a wavelength channels to realize a channel block function.

4. The apparatus of claim 1, wherein the dispersive elements are transmissive, and are disposed between the optical ports and the bulk optical element.

5. The apparatus of claim 1, wherein each routing element is statically configured to direct light to a respective specific output port.

6. The apparatus of claim 1, wherein each routing element is dynamically configurable to switch light to any output port.

7. The apparatus of claim 1, wherein each dispersive element comprises an array of waveguides having a predetermined optical path length difference spread across the array.

8. The apparatus of claim 1, further comprising additional output optical ports, each with a respective additional dispersive element; wherein a plurality of the additional dispersive elements are integrated into an additional waveguide device in a second plane, parallel to the first plane;
wherein each routing element is a micro-mirror tiltable in two dimensions.

9. The apparatus of claim 1, further comprising micro-optics coupling elements adapted to couple light from each port to/from the respective dispersive element.

10. The apparatus of claim 1 wherein each dispersive element comprises a transmissive diffraction grating.

11. The apparatus according to claim 1, wherein the dispersive elements and the routing elements are placed substantially at focal planes of the bulk optical element;
whereby each wavelength channel re-enters the waveguide device at an angle of incidence substantially equal to their respective exiting angle, providing increased coupling efficiency.

12. The apparatus according to claim 1 wherein the bulk optical element having optical power is a lens or a curved mirror.

13. The apparatus according to claim 1, wherein the bulk optical element comprises a main cylindrical lens element adapted to focus light in a first plane in the plane of the wavelength substrate, the apparatus further comprising a transverse cylindrical lens adapted to substantially collimate light in a second plane perpendicular to the first plane.

14. The apparatus according to claim 13, wherein the main cylindrical lens has a focal length such that the dispersive elements are in a focal plane of the lens on a first side of the lens, and the routing elements are in a focal plane of the lens on a second side of the lens; whereby each wavelength channel re-enters the waveguide device at an angle of incidence substantially equal to their respective exiting angle providing increased coupling efficiency.

15. The apparatus of claim 1 wherein the dispersive elements are selected from a group comprising: echelle grating, echellon gratings, prisms, arrayed waveguides.

16. The apparatus of claim 5 wherein each routing element is a tiltable micro-mirror.

17. The apparatus of claim 5 wherein each routing element is one of a liquid crystal beam steering element, an acousto-optic beam deflector, part of a solid state phase array, a controllable hologram, a periodically polled Lithium Niobate beam deflector.

18. The apparatus of claim 1, further comprising: an athermal mount for the routing elements adapted to shift the routing elements to compensate for changes in dispersive characteristics of the dispersive elements as a function of temperature.

19. The apparatus of claim 1, further comprising: an athermal mount for the dispersive elements adapted to tilt the dispersive elements to compensate for changes in dispersive characteristics of the dispersive elements as a function of temperature such that light exiting the dispersive elements is substantially centered on the routing elements.

20. The apparatus of claim 1, further comprising: a birefringent crystal beam displacer between the dispersive elements and the routing elements adapted to compensate for birefringence of the dispersive elements so as to make TE and TM sub-beams substantially coincide on the routing elements.

21. The apparatus of claim 1, further comprising: a quaffer wave plate in an optical path of the switch adapted to swap TE and TM sub-beams to cause losses for TE and TM polarization axes to be substantially averaged out (TE/TM or TM/TE).

22. The apparatus of claim 1, wherein the bulk optical element is a lens, each dispersive element is non-transmissive and the optical ports and routing elements are arranged on a first side of the lens and the dispersive elements are on a second side of the cylindrical lens.

23. The apparatus of claim 22 wherein the dispersive elements comprise non-transmissive diffraction gratings.

24. An apparatus comprising:
a plurality of optical ports including an input optical port for receiving an input optical signal with a plurality of wavelength channels, and at least two output optical ports;
for each optical port, a respective dispersive element optically connected to the optical port, the dispersive elements of the output optical ports being integrated on a first waveguide substrate in a first plane;
a plurality of transmissive routing elements;
a first bulk optical element having optical power; and
a second bulk optical element having optical power;
wherein the dispersive element of the input port disperses the wavelength channels in the input optical signal at respective exiting angles dependent upon wavelength, and
wherein the first bulk optical element redirects each one of the wavelength channels at a respective angle towards a respective one of said plurality of transmissive routing elements, and
wherein, for each wavelength channel the respective one of said plurality of transmissive routing elements directs said wavelength channel in the first plane via the second bulk optical element to a respective selected port of said output ports via the respective dispersive element of the selected output port at a respective angle of incidence dependent upon the selected output port.

25. The apparatus of claim 24 wherein each transmissive routing element is statically configured to direct light to a respective specific output port.

26. The apparatus of claim 24 wherein each transmissive routing element is dynamically configurable to switch light to any output port.

27. The apparatus of claim 24 wherein each dispersive element comprises an array of waveguides having a predetermined optical path length difference spread across the array.

28. The apparatus of claim 27, further comprising additional output ports with a respective dispersive element optically connected thereto; wherein the dispersive elements of the additional output ports are integrated onto a second waveguide device in a second plane forming a stack of waveguide devices; and
wherein each routing element is a micro-mirror tiltable in two dimensions.

29. The apparatus of claim 24 further comprising micro-optics coupling elements adapted to couple light from each port to/from the respective dispersive element.

30. The apparatus of claim 24 further comprising integrated optical coupling elements adapted to couple light from each port to/from the respective dispersive element.

31. The apparatus of claim 30 wherein the integrated optical coupling element comprise star couplers.

32. The apparatus according to claim 24 wherein the dispersive element of the input port is placed substantially at a focal plane of the first bulk optical element having optical power, and the dispersive elements of the output ports are placed substantially at a focal plane of the second bulk optical element having optical power, and the routing elements are also at a focal distance from both the first and second bulk optical elements, whereby each wavelength channel re-enters the waveguide device at an angle of incidence substantially equal to or opposite their respective exiting angle providing increased coupling efficiency.

33. The apparatus according to claim 24 wherein the first bulk optical element and the second bulk optical element are each a lens or, a curved mirror.

34. The apparatus according to claim 28, wherein: the first bulk optical element comprises a first main cylindrical lens adapted to focus light in the first plane; and
the second bulk optical element having optical power comprises a second main cylindrical lens adapted to focus light in the second plane;

the apparatus farther comprising:
a first transverse cylindrical lens adapted to substantially collimate light in a third plane perpendicular to the first plane; and
a second transverse cylindrical lens adapted to substantially collimate light in a fourth plane perpendicular to the second plane.

35. The apparatus according to claim 34, wherein the first main cylindrical lens has a focal length such that the dispersive element of the input port is in a first focal plane of the first main cylindrical lens on a first side of the first main cylindrical lens, and the transmissive routing elements are in a second focal plane of the first main cylindrical lens on a second side of the first main cylindrical lens; and
wherein the second main cylindrical lens has a focal length such that the dispersive elements of the output port are in a first focal plane of the second main cylindrical lens on a first side of the second main cylindrical lens, and the transmissive routing elements are in a second focal plane of the second main cylindrical lens on a second side of the second main cylindrical lens.

36. The apparatus of claim 24 wherein the waveguide dispersive elements are selected from a group comprising: echelle grating, echellon gratings grisms, prisms, arrayed waveguides.

37. The apparatus of claim 24 farther comprising: an athermal mount for the routing elements adapted to shift the routing elements to compensate for changes in dispersive characteristics of the dispersive elements as a function of temperature.

38. The apparatus of claim 24 farther comprising:
a first athermal mount for the dispersive element of the input port adapted to tilt the dispersive element of the input port to compensate for changes in dispersive characteristics of the dispersive element as a function of temperature such that light exiting the dispersive elements is substantially centered on the transmissive routing elements; and
a second athermal mount for the dispersive elements of the output ports adapted to tilt the dispersive elements of the output ports to compensate for changes in dispersive characteristics of the dispersive elements as a function of temperature such that light exiting the transmissive routing elements is accurately aligned with the dispersive elements of the output ports.

39. The apparatus of claim 24 further comprising:
a first birefringent crystal beam displacer between the dispersive element of the input port and the routing elements adapted to compensate for birefringence of the dispersive element of the input port so as to make TE and TM sub-beams substantially coincide on the routing elements; and
a second birefringent crystal beam displacer between the dispersive elements of the output port and the routing elements adapted to compensate for birefringence of the dispersive elements of the output ports so as to make TE and TM sub-beam's substantially coincide on the routing elements.

40. The apparatus of claim 24 further comprising:
a first quarter wave plate in an optical path of the switch on a first side of the transmissive routing elements adapted to swap TE and TM sub-beams to cause losses for TE and TM polarization axes to be substantially averaged out (TE/TM or TM/TE); and
a second quarter wave plate in an optical path of the switch on a second side of the transmissive routing elements adapted to swap TE and TM sub-beams to cause losses for TE and TM polarization axes to be substantially averaged out (TE/TM or TM/TE).

41. The apparatus of claim 24 wherein the dispersive elements are non-transmissive.

42. An apparatus comprising:
a stacked plurality of rows of optical ports, the ports comprising: an input optical port for receiving an input optical signal with a plurality of wavelength channels; and a plurality of output optical ports;
for each optical port, a respective dispersive element optically connected to the optical port, forming rows of multiple dispersive elements, wherein each row of dispersive elements is integrated on a different waveguide device, forming a stack of waveguide devices in parallel planes;
a bulk optical element having optical power;
a plurality of routing elements;
wherein the dispersive element of the input port disperses each of the wavelength channels at a different respective exiting angle dependent upon wavelength in a first plane;
wherein the bulk optical element redirects each of the the wavelength channels towards a respective one of the plurality of routing elements, and
wherein the plurality of routing elements directs each of said wavelength channels via the bulk optical element to a respective selected output port in the first plane or one of the planes parallel thereto via the respective dispersive element of the selected output port at a respective angle of incidence dependent upon wavelength and the selected output.

43. The apparatus of claim 42 wherein each routing element is statically configured to switch light to a respective specific output port.

44. The apparatus of claim 42 wherein each routing element is dynamically configurable to switch light to any output port.

45. The apparatus of claim 42 wherein each dispersive element comprises an array of waveguides having a predetermined optical path length difference spread across the array.

46. The apparatus of claim 42 further comprising micro-optics coupling elements adapted to couple light from each port to/from the respective dispersive element.

47. The apparatus of claim 42 further comprising integrated optical coupling elements adapted to couple light from each port to/from the respective dispersive element.

48. The apparatus of claim 47 wherein the integrated optical coupling element comprise star couplers.

49. The apparatus of claim 42 wherein each dispersive element comprises a diffraction grating.

50. The apparatus according to claim 42, wherein the dispersive elements and the routing elements are placed substantially at focal planes of the bulk optical element having optical power,
whereby each wavelength channel re-enters the waveguide device at an angle of incidence substantially equal to or opposite their respective exiting angle providing increased coupling efficiency.

51. The apparatus according to claim 42 wherein the bulk optical element having optical power is a lens or a curved mirror.

52. The apparatus according to claim 42, wherein: the bulk optical element having power comprises a main cylindrical lens element adapted to focus light in a first plane in the plane of the waveguide device substrates;

the apparatus further comprising: for each waveguide device, a respective transverse cylindrical lens adapted to substantially collimate light in a respective second plane perpendicular to the plane of the waveguide device substrates.

53. The apparatus according to claim 52, wherein the main cylindrical lens has a focal length such that the dispersive elements are in a focal plane of the lens on a first side of the lens, and the routing elements are in a focal plane of the lens on a second side of the lens, whereby each wavelength channel re-enters the waveguide device at an angle of incidence substantially equal to or opposite their respective exiting angle providing increased coupling efficiency.

54. The apparatus of claim 42 wherein the dispersive elements are selected from a group comprising: echelle grating, echellon gratings grisms, prisms, arrayed waveguides.

55. The apparatus of claim 42 wherein each routing element is a micro-mirror tiltable in two dimensions.

56. The apparatus of claim 42 wherein each routing element is one of a liquid crystal beam steering element, an acousto-optic beam deflector, part of a solid state phase array, a controllable hologram, a periodically polled Lithium Niobate beam deflector.

57. The apparatus of claim 42 further comprising: an athermal mount for the routing elements adapted to shift the routing elements to compensate for changes in dispersive characteristics of the dispersive elements as a function of temperature.

58. The apparatus of claim 42 further comprising: an athermal mount for the dispersive elements adapted to tilt the dispersive elements to compensate for changes in dispersive characteristics of the dispersive elements as a function of temperature such that light exiting the dispersive elements is substantially centered on the routing elements.

59. The apparatus of claim 42 further comprising: a birefringent crystal beam displacer between the dispersive elements and the routing elements adapted to compensate for birefringence of the dispersive elements so as to make TE and TM sub-beams substantially coincide on the routing elements.

60. The apparatus of claim 42 further comprising: a quarter wave plate in an optical path of the switch adapted to swap TE and TM sub-beams to cause losses for TE and TM polarization axes to be substantially averaged out (TE/TM or TM/TE).

\* \* \* \* \*